United States Patent
Touchi et al.

(10) Patent No.: US 8,665,532 B2
(45) Date of Patent: Mar. 4, 2014

(54) ZOOM LENS SYSTEM, IMAGING DEVICE AND CAMERA

(75) Inventors: Yasunori Touchi, Osaka (JP); Yoshiaki Kurioka, Osaka (JP); Shunichiro Yoshinaga, Hyogo (JP)

(73) Assignee: Panasonic Corporation, Kadoma-shi (JP)

( * ) Notice: Subject to any disclaimer, the term of this patent is extended or adjusted under 35 U.S.C. 154(b) by 50 days.

(21) Appl. No.: 13/393,540

(22) PCT Filed: Oct. 18, 2010

(86) PCT No.: PCT/JP2010/006156
§ 371 (c)(1),
(2), (4) Date: Feb. 29, 2012

(87) PCT Pub. No.: WO2011/048789
PCT Pub. Date: Apr. 28, 2011

(65) Prior Publication Data
US 2012/0169903 A1    Jul. 5, 2012

(30) Foreign Application Priority Data

Oct. 19, 2009 (JP) ................................ 2009-240123
Oct. 19, 2009 (JP) ................................ 2009-240124

(51) Int. Cl.
*G02B 15/14* (2006.01)
(52) U.S. Cl.
USPC ........... 359/687; 359/683; 359/684; 359/685; 359/715; 359/740; 359/774
(58) Field of Classification Search
USPC .......................... 359/683–687, 715, 740, 774
See application file for complete search history.

(56) References Cited

U.S. PATENT DOCUMENTS

2009/0251797 A1* 10/2009 Saruwatari .................... 359/687
2011/0194017 A1*  8/2011 Yoshitsugu ................... 359/687

FOREIGN PATENT DOCUMENTS

| JP | 2005-181499 A | 7/2005 |
| JP | 2006-133631 A | 5/2006 |
| JP | 2006-171055 A | 6/2006 |
| JP | 2007-047538 A | 2/2007 |
| JP | 2007-212537 A | 8/2007 |
| JP | 2007-271711 A | 10/2007 |
| JP | 2008-102166 A | 5/2008 |
| JP | 2008-191291 A | 8/2008 |
| JP | 2009-047986 A | 3/2009 |
| JP | 2009-098458 A | 5/2009 |
| JP | 2009-139701 A | 6/2009 |
| JP | 2009-169082 A | 7/2009 |

* cited by examiner

*Primary Examiner* — Evelyn A Lester
(74) *Attorney, Agent, or Firm* — Judge Patent Associates

(57) ABSTRACT

A zoom lens system, in order from an object side to an image side, comprising a positive first lens unit, a negative second lens unit, a positive third lens unit, and a positive fourth lens unit, wherein the first lens unit is composed of a cemented lens element of one object side negative lens element and one image side positive lens element, the fourth lens unit is composed of one lens element, in zooming, the first to fourth lens units are individually moved along an optical axis so that air spaces between the respective lens units vary for magnification change, and the conditions: $vd_{L12} < 43.50$ and $f_T/f_W \geq 6.0$ ($vd_{L12}$: an Abbe number of the positive lens element in the first lens unit, $f_T$ and $f_W$: focal lengths of the entire system at a telephoto limit and a wide-angle limit) are satisfied; an imaging device; and a camera.

16 Claims, 25 Drawing Sheets

ZOOM LENS SYSTEM, IMAGING DEVICE AND CAMERA

TECHNICAL FIELD

The present invention relates to zoom lens systems, imaging devices and cameras. In particular, the present invention relates to: a high-performance zoom lens system having a small size and still having a wide view angle at a wide-angle limit and a high zooming ratio in a well-balanced manner; an imaging device employing the zoom lens system; and a thin and compact camera employing the imaging device.

BACKGROUND ART

Size reduction and performance improvement are strongly required of digital still cameras, digital video cameras and the like (simply referred to as digital cameras, hereinafter) each provided with an image sensor for performing photoelectric conversion. In particular, from a convenience point of view, a digital camera is strongly desired which employs a zoom lens system having a high zooming ratio and being able to cover a wide focal-length range from a wide angle condition to a high telephoto condition. On the other hand, in recent years, a zoom lens system is also desired which has a wide angle range where the photographing field is large.

As zoom lens systems having a high zooming ratio and zoom lens systems having a wide angle range, there have conventionally been proposed various kinds of zoom lenses each having a four-unit configuration of positive, negative, positive, and positive, in which a first lens unit having positive optical power, a second lens unit having negative optical power, a third lens unit having positive optical power, and a fourth lens unit having positive optical power are arranged in order from the object side to the image side.

Japanese Laid-Open Patent Publication No. 2009-139701 discloses a zoom lens having the above-mentioned four-unit configuration of positive, negative, positive, and positive. In this zoom lens, at the time of magnification change from a wide-angle limit to a telephoto limit, at least a first lens unit, a second lens unit, and a third lens unit move and thereby the intervals between the respective lens units vary. The first lens unit is composed of one lens element. The third lens unit includes two lenses, a positive lens and a negative lens. The relation between a ratio of the amount of axial movement of the first lens unit at a telephoto limit relative to at a wide-angle limit to the amount of axial movement of the third lens unit at a telephoto limit relative to at a wide-angle limit, and a ratio of the maximum length of the lens in the third lens unit to the maximum length of the lens in the fourth lens unit, each maximum length being measured from one end to the other end of the lens along a straight line that is orthogonal to the optical axis and includes the position where the optical axis passes, is set forth.

Japanese Laid-Open Patent Publication No. 2009-098458 discloses a zoom lens having the above-mentioned four-unit configuration of positive, negative, positive, and positive. In this zoom lens, at the time of magnification change from a wide-angle limit to a telephoto limit, at least a first lens unit, a second lens unit, and a third lens unit move and thereby the intervals between the respective lens units vary. A ratio of the sum of the axial thicknesses of the respective lens units, to the focal length of the entire zoom lens at a telephoto limit, is set forth.

Japanese Laid-Open Patent Publication No. 2009-047986 discloses a zoom lens having the above-mentioned four-unit configuration of positive, negative, positive, and positive. In this zoom lens, at the time of magnification change from a wide-angle limit to a telephoto limit, at least a first lens unit, a second lens unit, and a third lens unit move and thereby the intervals between the respective lens units vary. The relation between the Abbe number and the partial dispersion ratio of at least one lens in the positive lens unit arranged on the object side relative to a diaphragm, is set forth.

Japanese Laid-Open Patent Publication No. 2008-191291 discloses a zoom lens having the above-mentioned four-unit configuration of positive, negative, positive, and positive. In this zoom lens, at the time of magnification change from a wide-angle limit to a telephoto limit, at least a first lens unit, a second lens unit, and a third lens unit move and thereby the intervals between the respective lens units vary. The positive lens unit arranged on the object side relative to a diaphragm includes a cemented lens obtained by cementing a plurality of lenses. The relation between the Abbe number and the partial dispersion ratio of at least one lens constituting the cemented lens, is set forth.

Japanese Laid-Open Patent Publication No. 2008-102166 discloses a zoom lens having the above-mentioned four-unit configuration of positive, negative, positive, and positive. In this zoom lens, at the time of magnification change from a wide-angle limit to a telephoto limit, at least a first lens unit, a second lens unit, and a third lens unit move and thereby the intervals between the respective lens units vary. The first lens unit is composed of two lenses. The third lens unit is composed of, in order from the object side, two lenses, a positive lens and a negative lens. A ratio of the axial thickness of a positive lens to the axial thickness of a negative lens in the first lens unit is set forth.

Japanese Laid-Open Patent Publication No. 2007-271711 discloses a zoom lens having the above-mentioned four-unit configuration of positive, negative, positive, and positive. In this zoom lens, at the time of magnification change from a wide-angle limit to a telephoto limit, at least a first lens unit, a second lens unit, and a third lens unit move and thereby the intervals between the respective lens units vary. The first lens unit is composed of two or less lenses including a positive lens. The second lens unit includes, in order from the object side to the image side, a negative lens, a compound lens comprising two optical members having refractive powers of different signs, and a positive lens.

Japanese Laid-Open Patent Publication No. 2007-212537 discloses a zoom lens having the above-mentioned four-unit configuration of positive, negative, positive, and positive. In this zoom lens, at the time of magnification change from a wide-angle limit to a telephoto limit, at least a first lens unit, a second lens unit, and a third lens unit move and thereby the intervals between the respective lens units vary. A ratio of the distance from the vertex of an object side surface of a lens arranged closest to the object side in the first lens unit to the vertex of an object side surface of a lens arranged closest to the object side in the third lens unit, at a zoom position where the first lens unit is positioned closest to the image side at the time of zooming, to the focal length of the entire lens system at the zoom position, is set forth.

Japanese Laid-Open Patent Publication No. 2007-047538 discloses a zoom lens having the above-mentioned four-unit configuration of positive, negative, positive, and positive. In this zoom lens, at the time of magnification change from a wide-angle limit to a telephoto limit, at least a first lens unit, a second lens unit, and a third lens unit move and thereby the intervals between the respective lens units vary. The first lens unit comprises, in order from the object side to the image side, a negative lens and a positive lens. The second lens unit includes at least one positive lens. The relation between the amount of axial movement of the first lens unit at a telephoto limit relative to at a wide-angle limit, and a ratio of the focal length of the entire lens system at a wide-angle limit to the focal length of the entire lens system at a telephoto limit, is set forth.

Japanese Laid-Open Patent Publication No. 2006-171055 discloses a zoom lens having the above-mentioned four-unit configuration of positive, negative, positive, and positive. In this zoom lens, at the time of magnification change from a wide-angle limit to a telephoto limit, at least a first lens unit, a second lens unit, and a third lens unit move and thereby the intervals between the respective lens units vary. The first lens unit comprises, in order from the object side, one negative lens and one positive lens. The second lens unit comprises, in order from the object side, two negative lenses and one positive lens. The third lens unit comprises three or less lenses. A ratio of the focal length of the third lens unit to the focal length of the fourth lens unit is set forth.

Japanese Laid-Open Patent Publication No. 2005-181499 discloses a zoom lens having the above-mentioned four-unit configuration of positive, negative, positive, and positive. In this zoom lens, at the time of magnification change from a wide-angle limit to a telephoto limit, at least a first lens unit, a second lens unit, and a third lens unit move and thereby the intervals between the respective lens units vary. The first lens unit comprises one positive lens and one negative lens. The third lens element includes, in order from the object side, at least a positive lens and a negative lens. At least the positive lens in the third lens unit is a spherical lens. A lens positioned closest to the image side in the third lens unit has at least one aspheric surface.

CITATION LIST

Patent Literature

[PTL 1] Japanese Laid-Open Patent Publication No. 2009-139701
[PTL 2] Japanese Laid-Open Patent Publication No. 2009-098458
[PTL 3] Japanese Laid-Open Patent Publication No. 2009-047986
[PTL 4] Japanese Laid-Open Patent Publication No. 2008-191291
[PTL 5] Japanese Laid-Open Patent Publication No. 2008-102166
[PTL 6] Japanese Laid-Open Patent Publication No. 2007-271711
[PTL 7] Japanese Laid-Open Patent Publication No. 2007-212537
[PTL 8] Japanese Laid-Open Patent Publication No. 2007-047538
[PTL 9] Japanese Laid-Open Patent Publication No. 2006-171055
[PTL 10] Japanese Laid-Open Patent Publication No. 2005-181499

SUMMARY OF THE INVENTION

Technical Problems

Each of the zoom lenses disclosed in the above-mentioned patent literatures is reduced in size so as to be applicable to a thin and compact digital camera, but does not satisfy the requirements in recent years for well-balanced view angle at a wide-angle limit and zooming ratio.

The present invention has objects to provide: a high-performance zoom lens system having a small size and still having a wide view angle at a wide-angle limit and a high zooming ratio in a well-balanced manner; an imaging device employing the zoom lens system; and a thin and compact camera employing the imaging device.

Solution to the Problems (I) One of the above objects is achieved by the following zoom lens system. That is, the present invention relates to:

a zoom lens system, in order from an object side to an image side, comprising a first lens unit having positive optical power, a second lens unit having negative optical power, a third lens unit having positive optical power, and a fourth lens unit having positive optical power, wherein the first lens unit is composed of a cemented lens element obtained by cementing one object side negative lens element and one image side positive lens element, wherein the fourth lens unit is composed of one lens element, wherein in zooming from a wide-angle limit to a telephoto limit at the time of image taking, the first lens unit, the second lens unit, the third lens unit, and the fourth lens unit are individually moved along an optical axis so that air spaces between the respective lens units vary, thereby performing magnification change, and wherein the following conditions (1) and (a) are satisfied:

$$vd_{L12} < 43.50 \tag{1}$$

$$f_T/f_W \geq 6.0 \tag{a}$$

where,
$vd_{L12}$ is an Abbe number to the d-line of the positive lens element in the first lens unit,
$f_T$ is a focal length of the entire system at a telephoto limit, and
$f_W$ is a focal length of the entire system at a wide-angle limit.

One of the above objects is achieved by the following imaging device. That is, the present invention relates to:

an imaging device capable of outputting an optical image of an object as an electric image signal, comprising:

a zoom lens system that forms the optical image of the object; and an image sensor that converts the optical image formed by the zoom lens system into the electric image signal, wherein the zoom lens system, in order from an object side to an image side, comprises a first lens unit having positive optical power, a second lens unit having negative optical power, a third lens unit having positive optical power, and a fourth lens unit having positive optical power, wherein the first lens unit is composed of a cemented lens element obtained by cementing one object side negative lens element and one image side positive lens element, wherein the fourth lens unit is composed of one lens element, wherein in zooming from a wide-angle limit to a telephoto limit at the time of image taking, the first lens unit, the second lens unit, the third lens unit, and the fourth lens unit are individually moved along an optical axis so that air spaces between the respective lens units vary, thereby performing magnification change, and wherein the following conditions (1) and (a) are satisfied:

$$vd_{L12} < 43.50 \tag{1}$$

$$f_T/f_W \geq 6.0 \tag{a}$$

where, $vd_{L12}$ is an Abbe number to the d-line of the positive lens element in the first lens unit, $f_T$ is a focal length of the entire system at a telephoto limit, and $f_W$ is a focal length of the entire system at a wide-angle limit.

One of the above objects is achieved by the following camera. That is, the present invention relates to:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having positive optical power, a second lens unit having negative optical power, a third lens unit having positive optical power, and a fourth lens unit having positive optical power, wherein the first lens unit is composed of a cemented lens element obtained by cementing one object side negative lens element and one image side positive lens element, wherein the fourth lens unit is composed of one lens element, wherein in zooming from a wide-angle limit to a telephoto limit at the time of image taking, the first lens unit, the second lens unit, the third lens unit, and the fourth lens unit are individually moved along an optical axis so that air spaces between the respective lens units vary, thereby performing magnification change, and wherein the following conditions (1) and (a) are satisfied:

$$vd_{L12} < 43.50 \qquad (1)$$

$$f_T/f_W \geq 6.0 \qquad (a)$$

where, $vd_{L12}$ is an Abbe number to the d-line of the positive lens element in the first lens unit, $f_T$ is a focal length of the entire system at a telephoto limit, and $f_W$ is a focal length of the entire system at a wide-angle limit.

(II) One of the above objects is achieved by the following zoom lens system. That is, the present invention relates to:

a zoom lens system, in order from an object side to an image side, comprising a first lens unit having positive optical power, a second lens unit having negative optical power, a third lens unit having positive optical power, and a fourth lens unit having positive optical power, wherein the first lens unit is composed of two lens elements, wherein the fourth lens unit is composed of one lens element, wherein in zooming from a wide-angle limit to a telephoto limit at the time of image taking, the first lens unit, the second lens unit, the third lens unit, and the fourth lens unit are individually moved along an optical axis so that air spaces between the respective lens units vary, thereby performing magnification change, wherein the third lens unit is composed of three lens elements and at least one of the three lens elements satisfies the following condition (2), or at least two of lens elements constituting the third lens unit satisfy the following condition (2):

$$\left. \begin{array}{l} \text{when } vd_{L3n} \leq 34, \\ 0.0000 < PgF_{L3n} + 0.0038 \times vd_{L3n} - 0.7250 \\ \text{when } 34 < vd_{L3n} < 59, \\ 0.0000 < PgF_{L3n} + 0.0020 \times vd_{L3n} - 0.6640 \end{array} \right\} \qquad (2)$$

where, $vd_{L3n}$ is an Abbe number to the d-line of each lens element in the third lens unit, $PgF_{L3n}$ is a partial dispersion ratio of each lens element in the third lens unit, which ratio is expressed by $PgF_{L3n} = (ng - nF)/(nF - nC)$, ng is a refractive index to the g-line, nF is a refractive index to the F-line, and nC is a refractive index to the C-line, and wherein the following condition (a) is satisfied:

$$f_T/f_W \geq 6.0 \qquad (a)$$

where, $f_T$ is a focal length of the entire system at a telephoto limit, and $f_W$ is a focal length of the entire system at a wide-angle limit.

One of the above objects is achieved by the following imaging device. That is, the present invention relates to:

an imaging device capable of outputting an optical image of an object as an electric image signal, comprising:

a zoom lens system that forms the optical image of the object; and an image sensor that converts the optical image formed by the zoom lens system into the electric image signal, wherein the zoom lens system, in order from an object side to an image side, comprises a first lens unit having positive optical power, a second lens unit having negative optical power, a third lens unit having positive optical power, and a fourth lens unit having positive optical power, wherein the first lens unit is composed of two lens elements, wherein the fourth lens unit is composed of one lens element, wherein in zooming from a wide-angle limit to a telephoto limit at the time of image taking, the first lens unit, the second lens unit, the third lens unit, and the fourth lens unit are individually moved along an optical axis so that air spaces between the respective lens units vary, thereby performing magnification change, wherein the third lens unit is composed of three lens elements and at least one of the three lens elements satisfies the following condition (2), or at least two of lens elements constituting the third lens unit satisfy the following condition (2):

$$\left. \begin{array}{l} \text{when } vd_{L3n} \leq 34, \\ 0.0000 < PgF_{L3n} + 0.0038 \times vd_{L3n} - 0.7250 \\ \text{when } 34 < vd_{L3n} < 59, \\ 0.0000 < PgF_{L3n} + 0.0020 \times vd_{L3n} - 0.6640 \end{array} \right\} \qquad (2)$$

where, $vd_{L3n}$ is an Abbe number to the d-line of each lens element in the third lens unit, $PgF_{L3n}$ is a partial dispersion ratio of each lens element in the third lens unit, which ratio is expressed by $PgF_{L3n} = (ng - nF)/(nF - nC)$, ng is a refractive index to the g-line,
nF is a refractive index to the F-line, and
nC is a refractive index to the C-line,
and wherein
the following condition (a) is satisfied:

$$f_T/f_W \geq 6.0 \qquad (a)$$

where,
$f_T$ is a focal length of the entire system at a telephoto limit, and
$f_W$ is a focal length of the entire system at a wide-angle limit.

One of the above objects is achieved by the following camera. That is, the present invention relates to:

a camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises a first lens unit having positive optical power, a second lens unit having negative optical power, a third lens unit having positive optical power, and a fourth lens unit having positive optical power, wherein the first lens unit is composed of two lens elements, wherein the fourth lens unit is composed of one lens element, wherein in zooming from a wide-angle limit to a telephoto limit at the time of image taking, the first lens unit, the second lens unit, the third lens unit, and the fourth lens unit are individually moved along an optical axis so that air spaces between the respective lens units vary, thereby performing magnification change, wherein the third lens unit is composed of three lens elements and at least one of the three lens elements satisfies the following condition (2), or at least two of lens elements constituting the third lens unit satisfy the following condition (2):

$$\left. \begin{array}{l} \text{when } vd_{L3n} \leq 34, \\ 0.0000 < PgF_{L3n} + 0.0038 \times vd_{L3n} - 0.7250 \\ \text{when } 34 < vd_{L3n} < 59, \\ 0.0000 < PgF_{L3n} + 0.0020 \times vd_{L3n} - 0.6640 \end{array} \right\} \qquad (2)$$

where,
$vd_{L3n}$ is an Abbe number to the d-line of each lens element in the third lens unit,
$PgF_{L3n}$ is a partial dispersion ratio of each lens element in the third lens unit, which ratio is expressed by $$PgF_{L3n}=(ng-nF)/(nF-nC),$$

ng is a refractive index to the g-line,
nF is a refractive index to the F-line, and
nC is a refractive index to the C-line,
and wherein
the following condition (a) is satisfied:

$$f_T/f_W \geq 6.0 \qquad (a)$$

where,
$f_T$ is a focal length of the entire system at a telephoto limit, and
$f_W$ is a focal length of the entire system at a wide-angle limit.

Advantageous Effects of the Invention

The present invention provides: a high-performance zoom lens system having a small size and still having a wide view angle at a wide-angle limit and a high zooming ratio in a well-balanced manner; an imaging device employing the zoom lens system; and a thin and compact camera employing the imaging device.

DESCRIPTION OF EMBODIMENTS

Figure 1:
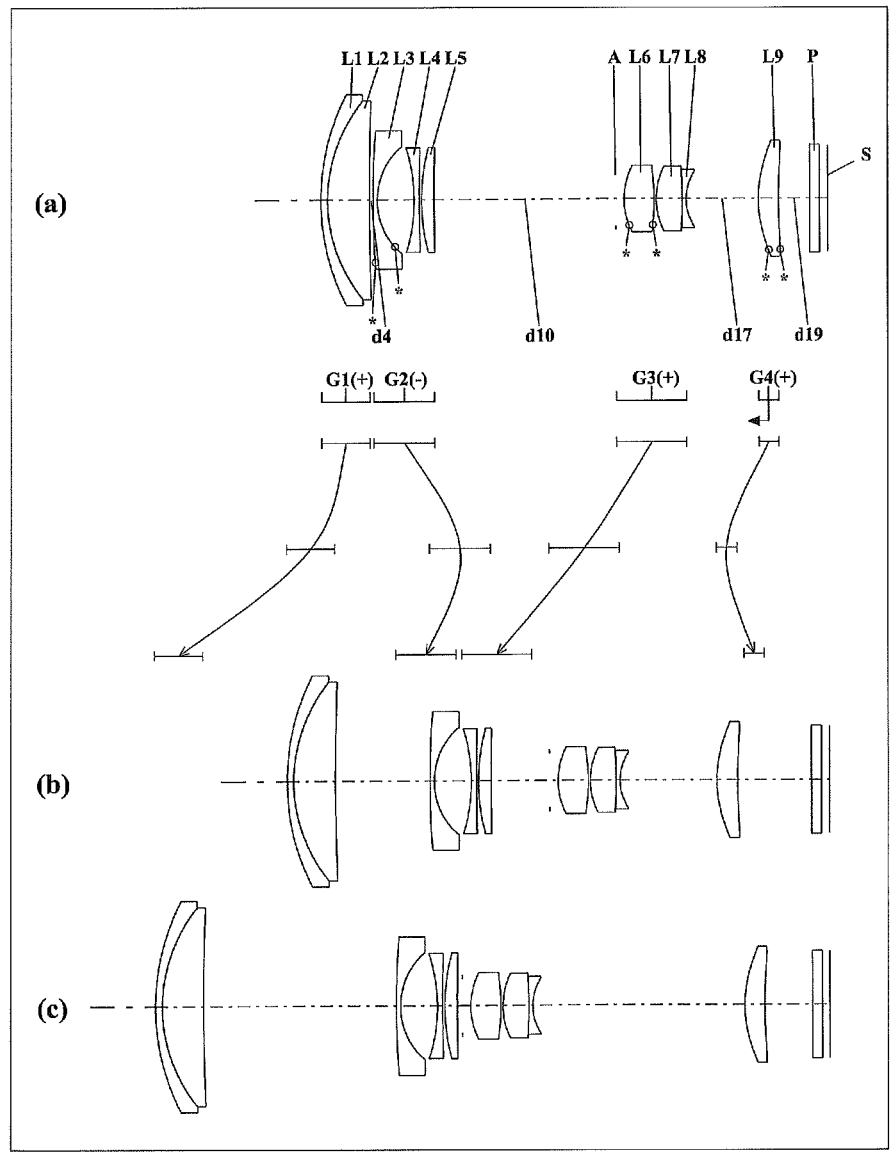
FIG. 1 is a lens arrangement diagram showing an infinity in-focus condition of a zoom lens system according to Embodiment 1 (Example 1).
Figure 2:
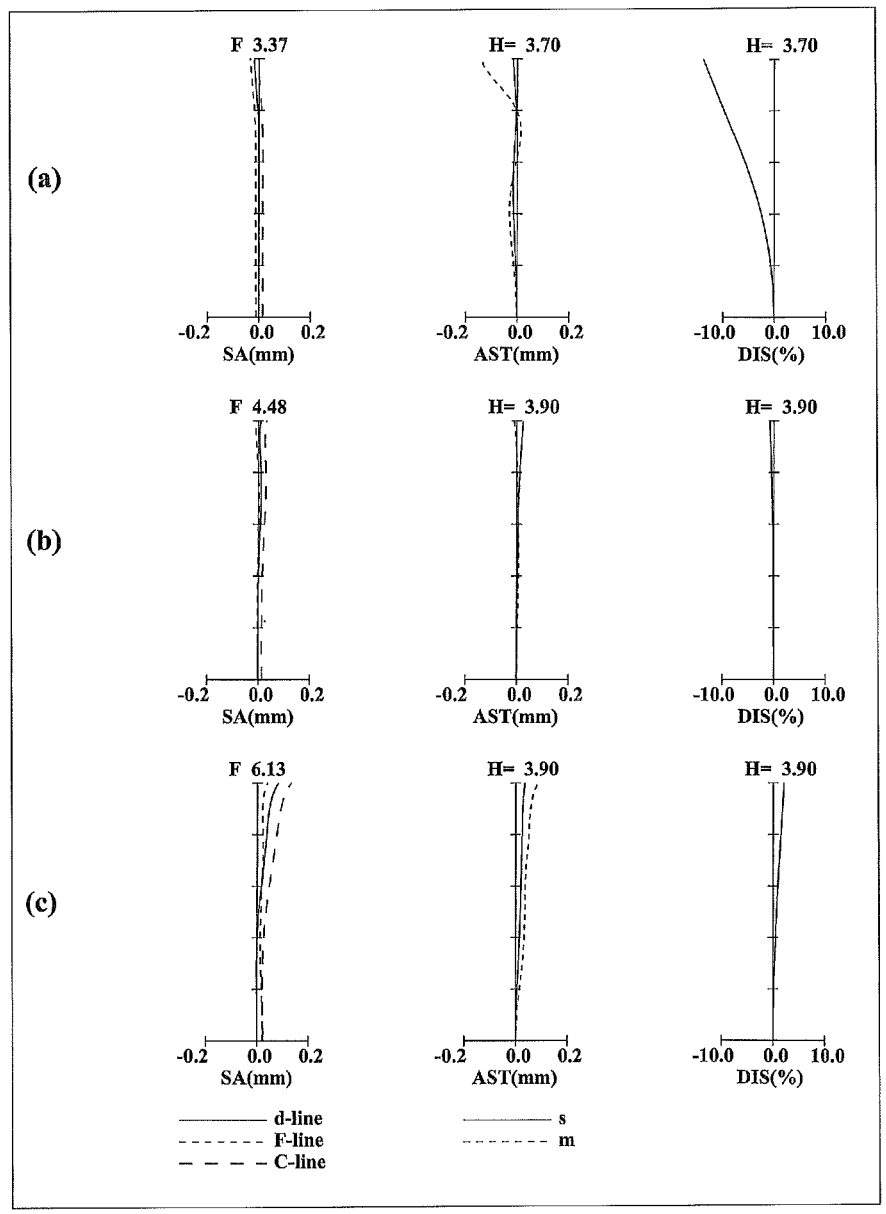
FIG. 2 is a longitudinal aberration diagram of an infinity in-focus condition of a zoom lens system according to Example 1.
Figure 3:
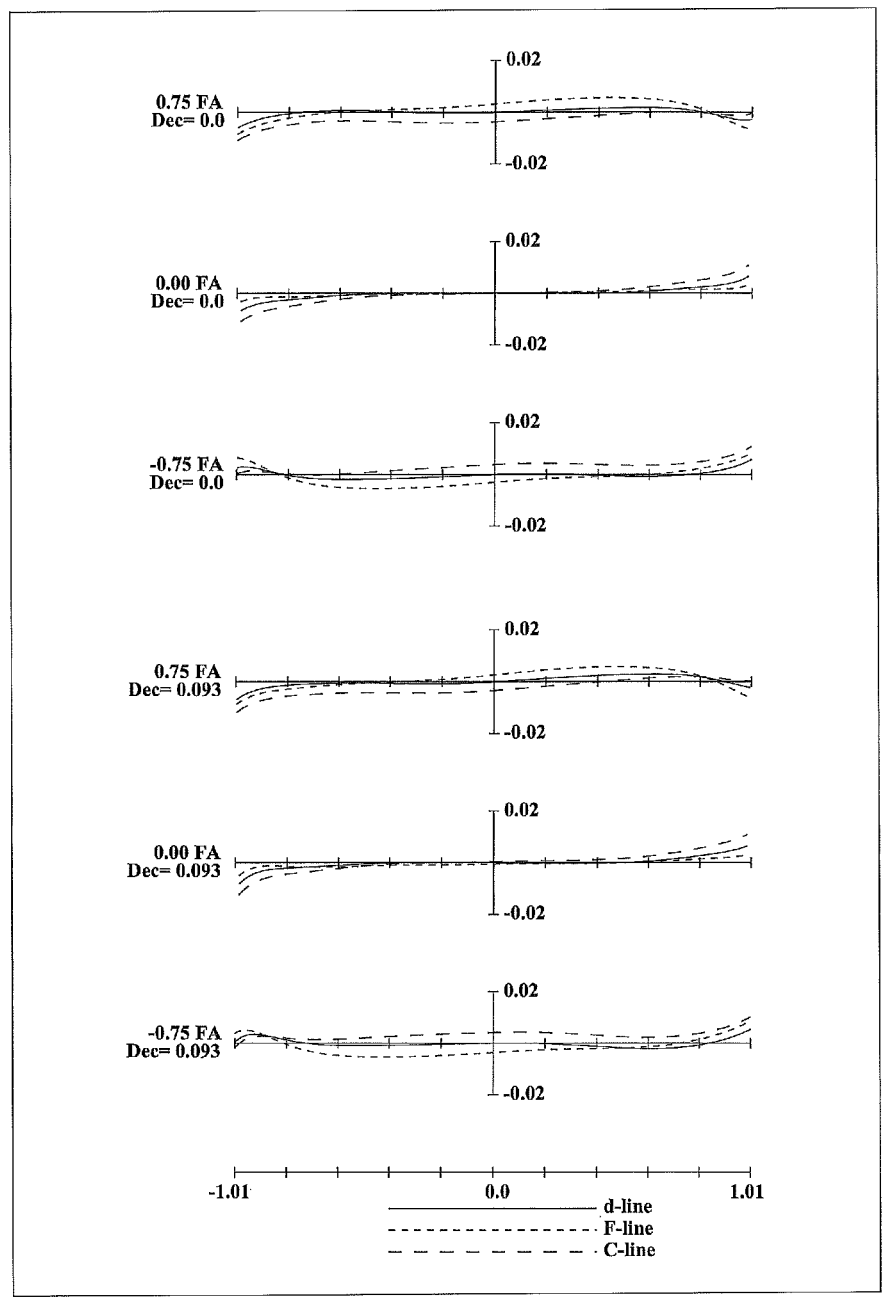
FIG. 3 is a lateral aberration diagram of a zoom lens system according to Example 1 at a telephoto limit in a basic state where image blur compensation is not performed and in a blur compensation state.

FIGS. 1, 4, 7, 10, 13, 16, 19 and 22 are lens arrangement diagrams of zoom lens systems according to Embodiments 1, 2, 3, 4, 5, 6, 7 and 8, respectively, and each FIG. shows a zoom lens system in an infinity in-focus condition.

In each FIG. part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in in each figure, an arrow of straight or curved line provided between part (a) and part (b) indicates the movement of each lens unit from a wide-angle limit through a middle position to a telephoto limit. Moreover, in each FIG. an arrow imparted to a lens unit indicates focusing from an infinity in-focus condition to a close-object in-focus condition. That is, the arrow indicates the moving direction at the time of focusing from an infinity in-focus condition to a close-object in-focus condition.

Further, in FIGS. 1, 4, 7, 10, 13, 16, 19 and 22, an asterisk "*" imparted to a particular surface indicates that the surface is aspheric. In each FIG., symbol (+) or (−) imparted to the symbol of each lens unit corresponds to the sign of the optical power of the lens unit. In each FIG., the straight line located on the most right-hand side indicates the position of the image surface S. On the object side relative to the image surface S (that is, between the image surface S and the most image side lens surface of the fourth lens unit G4), a plane parallel plate P equivalent to an optical low-pass filter or a face plate of an image sensor is provided.

Further, in FIGS. 1, 4, 7, 10, 13, 16, 19 and 22, an aperture diaphragm A is provided closest to the object side in the third lens unit G3. In zooming from a wide-angle limit to a telephoto limit at the time of image taking, the aperture diaphragm A moves along the optical axis integrally with the third lens unit G3.

Each of the zoom lens systems according to Embodiments 1 to 8, in order from the object side to the image side, comprises: a first lens unit G1 having positive optical power; a second lens unit G2 having negative optical power; a third lens unit G3 having positive optical power; and a fourth lens unit G4 having positive optical power.

(Embodiment 1)

The first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus third lens element L3 with the convex surface facing the object side; a bi-concave fourth lens element L4; and a positive meniscus fifth lens element L5 with the convex surface facing the object side. The third lens element L3 has two aspheric surfaces.

The third lens unit G3, in order from the object side to the image side, comprises: a bi-convex sixth lens element L6; a bi-convex seventh lens element L7; and a bi-concave eighth lens element L8. Among these, the seventh lens element L7 and the eighth lens element L8 are cemented with each other. In the surface data of the corresponding Numerical Example described later, surface number 15 is imparted to an adhesive layer between the seventh lens element L7 and the eighth lens element L8. The sixth lens element L6 has two aspheric surfaces.

The fourth lens unit G4 comprises solely a positive meniscus ninth lens element L9 with the convex surface facing the object side. The ninth lens element L9 has two aspheric surfaces.

In the zoom lens system according to Embodiment 1, a plane parallel plate P is provided on the object side relative to the image surface S (between the image surface S and the ninth lens element L9).

(Embodiment 2)

The first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus third lens element L3 with the convex surface facing the object side; a bi-concave fourth lens element L4; and a positive meniscus fifth lens element L5 with the convex surface facing the object side. The third lens element L3 has an aspheric image side surface.

The third lens unit G3, in order from the object side to the image side, comprises: a bi-convex sixth lens element L6; a bi-convex seventh lens element L7; and a bi-concave eighth lens element L8. Among these, the seventh lens element L7 and the eighth lens element L8 are cemented with each other.

In the surface data of the corresponding Numerical Example described later, surface number 15 is imparted to an adhesive layer between the seventh lens element L7 and the eighth lens element L8. The sixth lens element L6 has two aspheric surfaces.

The fourth lens unit G4 comprises solely a positive meniscus ninth lens element L9 with the convex surface facing the object side. The ninth lens element L9 has two aspheric surfaces.

In the zoom lens system according to Embodiment 2, a plane parallel plate P is provided on the object side relative to the image surface S (between the image surface S and the ninth lens element L9).

(Embodiment 3)

The first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus third lens element L3 with the convex surface facing the object side; a bi-concave fourth lens element L4; and a positive meniscus fifth lens element L5 with the convex surface facing the object side. The third lens element L3 has an aspheric image side surface.

The third lens unit G3, in order from the object side to the image side, comprises: a bi-convex sixth lens element L6; a bi-convex seventh lens element L7; and a bi-concave eighth lens element L8. Among these, the seventh lens element L7 and the eighth lens element L8 are cemented with each other. In the surface data of the corresponding Numerical Example described later, surface number 15 is imparted to an adhesive layer between the seventh lens element L7 and the eighth lens element L8. The sixth lens element L6 has two aspheric surfaces.

The fourth lens unit G4 comprises solely a bi-convex ninth lens element L9. The ninth lens element L9 has two aspheric surfaces.

In the zoom lens system according to Embodiment 3, a plane parallel plate P is provided on the object side relative to the image surface S (between the image surface S and the ninth lens element L9).

(Embodiment 4)

The first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus third lens element L3 with the convex surface facing the object side; a negative meniscus fourth lens element L4 with the concave surface facing the object side; and a positive meniscus fifth lens element L5 with the convex surface facing the object side. The third lens element L3 has two aspheric surfaces.

The third lens unit G3, in order from the object side to the image side, comprises: a bi-convex sixth lens element L6; a bi-convex seventh lens element L7; and a bi-concave eighth lens element L8. Among these, the seventh lens element L7 and the eighth lens element L8 are cemented with each other. In the surface data of the corresponding Numerical Example described later, surface number 15 is imparted to an adhesive layer between the seventh lens element L7 and the eighth lens element L8. The sixth lens element L6 has two aspheric surfaces.

The fourth lens unit G4 comprises solely a positive meniscus ninth lens element L9 with the convex surface facing the object side. The ninth lens element L9 has two aspheric surfaces.

In the zoom lens system according to Embodiment 4, a plane parallel plate P is provided on the object side relative to the image surface S (between the image surface S and the ninth lens element L9).

(Embodiment 5)

The first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus third lens element L3 with the convex surface facing the object side; a bi-concave fourth lens element L4; and a positive meniscus fifth lens element L5 with the convex surface facing the object side. The third lens element L3 has two aspheric surfaces.

The third lens unit G3, in order from the object side to the image side, comprises: a bi-convex sixth lens element L6; a bi-convex seventh lens element L7; and a bi-concave eighth lens element L8. Among these, the seventh lens element L7 and the eighth lens element L8 are cemented with each other. In the surface data of the corresponding Numerical Example described later, surface number 15 is imparted to an adhesive layer between the seventh lens element L7 and the eighth lens element L8. The sixth lens element L6 has two aspheric surfaces.

The fourth lens unit G4 comprises solely a positive meniscus ninth lens element L9 with the convex surface facing the object side. The ninth lens element L9 has two aspheric surfaces.

In the zoom lens system according to Embodiment 5, a plane parallel plate P is provided on the object side relative to the image surface S (between the image surface S and the ninth lens element L9).

(Embodiment 6)

The first lens unit G1, in order from the object side to the image side, comprises: a negative meniscus first lens element L1 with the convex surface facing the object side; and a positive meniscus second lens element L2 with the convex surface facing the object side. The first lens element L1 and the second lens element L2 are cemented with each other. In the surface data of the corresponding Numerical Example described later, surface number 2 is imparted to an adhesive layer between the first lens element L1 and the second lens element L2.

The second lens unit G2, in order from the object side to the image side, comprises: a negative meniscus third lens element L3 with the convex surface facing the object side; a bi-concave fourth lens element L4; and a positive meniscus fifth lens element L5 with the convex surface facing the object side. The third lens element L3 has two aspheric surfaces.

The third lens unit G3, in order from the object side to the image side, comprises: a bi-convex sixth lens element L6; a bi-convex seventh lens element L7; and a bi-concave eighth lens element L8. Among these, the seventh lens element L7 and the eighth lens element L8 are cemented with each other. In the surface data of the corresponding Numerical Example described later, surface number 15 is imparted to an adhesive layer between the seventh lens element L7 and the eighth lens element L8. The sixth lens element L6 has two aspheric surfaces.

The fourth lens unit G4 comprises solely a positive meniscus ninth lens element L9 with the convex surface facing the object side. The ninth lens element L9 has two aspheric surfaces.

In the zoom lens system according to Embodiment 6, a plane parallel plate P is provided on the object side relative to the image surface S (between the image surface S and the ninth lens element L9).

(Embodiment 7)

The first lens unit G1, in order from the object side to the image side, comprises: a negative meniscus first lens element L1 with the convex surface facing the object side; and a bi-convex second lens element L2. The first lens element L1 and the second lens element L2 are cemented with each other. In the surface data of the corresponding Numerical Example described later, surface number 2 is imparted to an adhesive layer between the first lens element L1 and the second lens element L2. The second lens element L2 has an aspheric image side surface.

The second lens unit G2, in order from the object side to the image side, comprises: a negative meniscus third lens element L3 with the convex surface facing the object side; a bi-concave fourth lens element L4; and a positive meniscus fifth lens element L5 with the convex surface facing the object side. The third lens element L3 has an aspheric image side surface.

The third lens unit G3, in order from the object side to the image side, comprises: a bi-convex sixth lens element L6; a bi-convex seventh lens element L7; and a bi-concave eighth lens element L8. Among these, the seventh lens element L7 and the eighth lens element L8 are cemented with each other. In the surface data of the corresponding Numerical Example described later, surface number 15 is imparted to an adhesive layer between the seventh lens element L7 and the eighth lens element L8. The seventh lens element L7 has an aspheric object side surface.

The fourth lens unit G4 comprises solely a bi-convex ninth lens element L9. The ninth lens element L9 has two aspheric surfaces.

In the zoom lens system according to Embodiment 7, a plane parallel plate P is provided on the object side relative to the image surface S (between the image surface S and the ninth lens element L9).

(Embodiment 8)

The first lens unit G1, in order from the object side to the image side, comprises: a negative meniscus first lens element L1 with the convex surface facing the object side; and a bi-convex second lens element L2. The first lens element L1 and the second lens element L2 are cemented with each other. In the surface data of the corresponding Numerical Example described later, surface number 2 is imparted to an adhesive layer between the first lens element L1 and the second lens element L2. The second lens element L2 has an aspheric image side surface.

The second lens unit G2, in order from the object side to the image side, comprises: a bi-concave third lens element L3; a bi-concave fourth lens element L4; and a positive meniscus fifth lens element L5 with the convex surface facing the object side. The third lens element L3 has an aspheric image side surface.

The third lens unit G3, in order from the object side to the image side, comprises: a bi-convex sixth lens element L6; a bi-convex seventh lens element L7; and a bi-concave eighth lens element L8. The seventh lens element L7 has an aspheric object side surface.

The fourth lens unit G4 comprises solely a bi-convex ninth lens element L9. The ninth lens element L9 has two aspheric surfaces.

In the zoom lens system according to Embodiment 8, a plane parallel plate P is provided on the object side relative to the image surface S (between the image surface S and the ninth lens element L9).

In the zoom lens systems according to Embodiments 1 to 8, in zooming from a wide-angle limit to a telephoto limit at the time of image taking, the first lens unit G1 and the third lens unit G3 move to the object side, the second lens unit G2 moves with locus of a convex to the image side, and the fourth lens unit G4 moves to the image side with locus of a convex to the object side. That is, in zooming, the individual lens units move along the optical axis such that the interval between the second lens unit G2 and the third lens unit G3 should decrease.

Further, in the zoom lens systems according to Embodiments 1 to 8, in focusing from an infinity in-focus condition to a close in-focus condition, the fourth lens unit G4 moves to the object side along the optical axis.

In the zoom lens systems according to Embodiments 1 to 8, in zooming from a wide-angle limit to a telephoto limit at the time of image taking, the first lens unit G1, the second lens unit G2, the third lens unit G3, and the fourth lens unit G4 are individually moved along the optical axis to perform zooming. By moving any of the first lens unit G1, the second lens unit G2, the third lens unit G3, and the fourth lens unit G4, or a sub lens unit consisting of a part of each lens unit, in a direction perpendicular to the optical axis, image point movement caused by vibration of the entire system can be compensated, that is, image blur caused by hand blurring, vibration and the like can be compensated optically.

When image point movement caused by vibration of the entire system is to be compensated, for example, the third lens unit G3 is moved in a direction perpendicular to the optical axis, so that image blur is compensated in a state that size increase in the entire zoom lens system is suppressed to realize a compact construction and that excellent imaging characteristics such as small decentering coma aberration and small decentering astigmatism are satisfied.

In a case where a lens unit is composed of a plurality of lens elements, the above-mentioned sub lens unit consisting of a part of a lens unit indicates any one lens element or a plurality of adjacent lens elements among the plurality of lens elements.

In the zoom lens systems according to Embodiments 1 to 8, the first lens unit G1 comprises two lens elements, and the second lens unit G2 comprises three lens elements, thereby realizing a short overall length of the zoom lens system.

In the zoom lens systems according to Embodiments 1 to 4, the first lens unit G1, in order from the object side to the image side, comprises the negative meniscus lens element L1 with the convex surface facing the object side, and the positive meniscus lens element L2 with the convex surface facing the object side, and the negative meniscus lens element L1 and the positive meniscus lens element L2 are cemented with each other to form a cemented lens element, thereby realizing a compact lens system. Furthermore, this configuration allows successful compensation of chromatic aberration.

In the zoom lens systems according to Embodiments 1 to 4, the two lens elements constituting the first lens unit G1 and the three lens elements constituting the second lens unit G2, except the fourth lens element L4 arranged in the center of the second lens unit G2, each have a positive radius of curvature. Therefore, it is possible to compensate curvature of field while keeping the lens system compact.

In the zoom lens systems according to Embodiments 5 to 8, the first lens unit G1, in order from the object side to the image side, comprises the negative meniscus lens element L1 with the convex surface facing the object side, and the positive meniscus lens element L2 with the convex surface facing the object side or the bi-convex lens element L2, and the negative meniscus lens element L1 and the lens element L2 are cemented with each other to form a cemented lens element, thereby realizing a compact lens system. Furthermore, this configuration allows successful compensation of chromatic aberration.

In the zoom lens systems according to Embodiments 1 to 4, the third lens unit G3, in order from the object side to the image side, comprises the sixth lens element L6 having two aspheric surfaces and positive optical power, the seventh lens element L7 having positive optical power, and the eighth lens element L8 having negative optical power, and the seventh lens element L7 as an image side positive lens element and the eighth lens element L8 are cemented with each other to form a cemented lens element. Therefore, it is possible to successfully compensate spherical aberration, coma aberration, and chromatic aberration.

In the zoom lens systems according to Embodiments 5 to 8, the third lens unit G3, in order from the object side to the image side, comprises the sixth lens element L6 having positive optical power, the seventh lens element L7 having positive optical power, and the eighth lens element L8 having negative optical power, and at least one aspheric surface is included in the third lens unit G3. Therefore, it is possible to successfully compensate spherical aberration and coma aberration.

In the zoom lens systems according to Embodiments 1 to 8, the fourth lens unit G4 comprises one lens element, and the lens element has positive optical power, thereby realizing a short overall length of the zoom lens system. When performing focusing from an infinity-object side to a close-object side, the fourth lens unit G4 is moved toward the object side as shown in each FIG., thereby facilitating rapid focusing. Further, since the one lens element constituting the fourth lens unit G4 has two aspheric surfaces, it is possible to successfully compensate off-axis curvature of field from a wide-angle limit to a telephoto limit.

The following description is given for conditions preferred to be satisfied by a zoom lens system like the zoom lens systems according to Embodiments 1 to 8. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect can be obtained.

For example, in a zoom lens system like the zoom lens systems according to Embodiments 1 to 4, which comprises, in order from the object side to the image side, a first lens unit having positive optical power, a second lens unit having negative optical power, a third lens unit having positive optical power, and a fourth lens unit having positive optical power, wherein the first lens unit is composed of a cemented lens element obtained by cementing one object side negative lens element and one image side positive lens element, and the fourth lens unit is composed of one lens element (this lens configuration is referred to as a basic configuration I of the embodiment, hereinafter), it is preferable that the following conditions (1) and (a) are satisfied.

$$vd_{L12} < 43.50 \tag{1}$$

$$f_T/f_W \geq 6.0 \tag{a}$$

where, $vd_{L12}$ is an Abbe number to the d-line of the positive lens element in the first lens unit, $f_T$ is a focal length of the entire system at a telephoto limit, and $f_W$ is a focal length of the entire system at a wide-angle limit.

The condition (1) sets forth an appropriate Abbe number of the positive lens element in the first lens unit. When the value exceeds the upper limit of the condition (1), it might become difficult to control variation in axial chromatic aberration that is caused by zooming.

When the following condition (1)' is further satisfied, the above-mentioned effect is achieved more successfully.

$$vd_{L12} \leq 42.00 \tag{1'}$$

For example, in a zoom lens system like the zoom lens systems according to Embodiments 5 to 8, which comprises, in order from the object side to the image side, a first lens unit having positive optical power, a second lens unit having negative optical power, a third lens unit having positive optical power, and a fourth lens unit having positive optical power, wherein the first lens unit is composed of two lens elements, and the fourth lens unit is composed of one lens element (this lens configuration is referred to as a basic configuration II of the embodiment, hereinafter), it is preferable that the zoom lens system satisfies the following condition (a), and then it is preferable that:

at least one of three lens elements satisfies the following condition (2) when the third lens unit is composed of the three lens elements; or at least two of lens elements constituting the third lens unit satisfy the following condition (2).

$$\left.\begin{array}{l} \text{when } vd_{L3n} \leq 34, \\ 0.0000 < PgF_{L3n} + 0.0038 \times vd_{L3n} - 0.7250 \\ \text{when } 34 < vd_{L3n} < 59, \\ 0.0000 < PgF_{L3n} + 0.0020 \times vd_{L3n} - 0.6640 \end{array}\right\} \tag{2}$$

$$f_T/f_W \geq 6.0 \tag{a}$$

where, $vd_{L3n}$ is an Abbe number to the d-line of each lens element in the third lens unit, $PgF_{L3n}$ is a partial dispersion ratio of each lens element in the third lens unit, which ratio is expressed by $$PgF_{L3n} = (ng - nF)/(nF - nC),$$

ng is a refractive index to the g-line,
nF is a refractive index to the F-line,
nC is a refractive index to the C-line,
$f_T$ is a focal length of the entire system at a telephoto limit, and
$f_W$ is a focal length of the entire system at a wide-angle limit.

The condition (2) sets forth an appropriate Abbe number and an appropriate partial dispersion ratio of the lens elements constituting the third lens unit. When none of the three lens elements constituting the third lens unit satisfies the condition (2), it might become difficult to control the balance between secondary spectrum and monochromatic aberration in the entire zoom region.

When the following condition (2)' is further satisfied, the above-mentioned effect is achieved more successfully.

$$\left.\begin{array}{l} \text{when } vd_{L3n} \le 34, \\ 0.0050 < PgF_{L3n} + 0.0038 \times vd_{L3n} - 0.7250 \\ \text{when } 34 < vd_{L3n} < 59, \\ 0.0050 < PgF_{L3n} + 0.0020 \times vd_{L3n} - 0.6640 \end{array}\right\} \quad \ldots$$

For example, a zoom lens system having the basic configuration I or II like the zoom lens systems according to Embodiments 1 to 8 preferably satisfies the following condition (3).

$$-30.0 < f_{G2}/t_{L21} < -5.0 \tag{3}$$

where, $f_{G2}$ is a composite focal length of the second lens unit, and
$t_{L21}$ is an axial thickness of a most object side lens element in the second lens unit.

The condition (3) sets forth a ratio of the focal length of the second lens unit to the thickness of the most object side lens element. When the value goes below the lower limit of the condition (3), it might become difficult to achieve a wide view angle. Furthermore, the lens element becomes too thin, which might cause difficulty in manufacturing such thin lens element. In contrast, when the value exceeds the upper limit of the condition (3), it might become difficult to control distortion at a wide-angle limit.

When at least one of the following conditions (3)' and (3)" is further satisfied, the above-mentioned effect is achieved more successfully.

$$-25.0 \le f_{G2}/t_{L21} \tag{3}'$$

$$f_{G2}/t_{L21} \le -15.0 \tag{3}''$$

For example, a zoom lens system having the basic configuration I or II like the zoom lens systems according to Embodiments 1 to 8 preferably satisfies the following condition (4).

$$0.5 < L_T/f_T < 2.5 \tag{4}$$

where, $L_T$ is an overall length of lens system at a telephoto limit (a distance from a most object side surface of the first lens unit to the image surface), and
$f_T$ is the focal length of the entire system at a telephoto limit.

The condition (4) sets forth the overall length of the zoom lens system at a telephoto limit. When the value goes below the lower limit of the condition (4), the optical power of each lens unit is increased and thereby the aberrations of each lens unit are increased, which might cause difficulty in compensating the aberrations. In contrast, when the value exceeds the upper limit of the condition (4), the optical power of each lens unit is reduced, and therefore the amount of movement of each lens unit should be increased to keep high magnification ratio, which might cause difficulty in ensuring compactness of the lens system.

When at least one of the following conditions (4)' and (4)" is further satisfied, the above-mentioned effect is achieved more successfully.

$$1.1 \le L_T/f_T \tag{4}'$$

$$L_T/f_T \le 1.4 \tag{4}''$$

For example, a zoom lens system having the basic configuration I or II like the zoom lens systems according to Embodiments 1 to 8 preferably satisfies the following condition (5).

$$3.5 < f_{G1}/|f_{G2}| < 6.0 \tag{5}$$

where, $f_{G1}$ is a composite focal length of the first lens unit, and
$f_{G2}$ is a composite focal length of the second lens unit.

The condition (5) sets forth a ratio of the focal length of the first lens unit to the focal length of the second lens unit. When the value goes below the lower limit of the condition (5), the focal length of the first lens unit becomes relatively too short and thereby it is difficult to maintain magnification function of the second lens unit, which might cause difficulty in constituting a zoom lens system having a high magnification ratio while maintaining optical performance. In contrast, when the value exceeds the upper limit of the condition (5), the focal length of the second lens unit becomes relatively too short, which might cause difficulty in compensating aberrations that occur in the second lens unit.

When at least one of the following conditions (5)' and (5)" is further satisfied, the above-mentioned effect is achieved more successfully.

$$4.0 \le f_{G1}/|f_{G2}| \tag{5}'$$

$$f_{G1}/|f_{G2}| \le 4.7 \tag{5}''$$

For example, a zoom lens system having the basic configuration I or II like the zoom lens systems according to Embodiments 1 to 8 preferably satisfies the following condition (6).

$$0.5 < f_T/f_{G1} < 3.0 \tag{6}$$

where, $f_{G1}$ is the composite focal length of the first lens unit, and
$f_T$ is the focal length of the entire system at a telephoto limit.

The condition (6) sets forth an appropriate focal length of the first lens unit. When the value goes below the lower limit of the condition (6), the optical power of the first lens unit is reduced, and therefore the amount of movement of the second lens unit should be increased to keep a high magnification ratio, which might cause difficulty in ensuring compactness of the lens system. In contract, when the value exceeds the upper limit of the condition (6), the optical power of the first lens unit is increased, and the amount of occurrence of aberrations is increased, which might cause difficulty in compensating axial chromatic aberration, in particular, at a telephoto limit.

When at least one of the following conditions (6)' and (6)" is further satisfied, the above-mentioned effect is achieved more successfully.

$$1.0 \le f_T/f_{G1} \tag{6}'$$

$$f_T/f_{G1} \le 1.4 \tag{6}''$$

For example, a zoom lens system having the basic configuration I or II like the zoom lens systems according to Embodiments 1 to 8 preferably satisfies the following condition (7).

$$2.0 < \beta_{2T}/\beta_{2W} < 6.5 \tag{7}$$

where, $\beta_{2T}$ is a lateral magnification of the second lens unit at a telephoto limit and in an infinity in-focus condition, and $\beta_{2W}$ is a lateral magnification of the second lens unit at a wide-angle limit and in an infinity in-focus condition.

The condition (7) sets forth the magnification change of the second lens unit, and is a condition that substantially optimizes the magnification load of the second lens unit at the time of zooming. When the condition (7) is not satisfied, the magnification load of the second lens unit becomes inappropriate, which might cause difficultly in constituting a compact zoom lens system while maintaining optical performance.

When at least one of the following conditions (7)' and (7)" is further satisfied, the above-mentioned effect is achieved more successfully.

$$2.4 \leq \beta_{2T}/\beta_{2W} \tag{7}'$$

$$\beta_{2T}/\beta_{2W} \leq 3.0 \tag{7}''$$

The lens units constituting the zoom lens system according to each embodiment are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is preferable.

(Embodiment 9)

Figure 25:
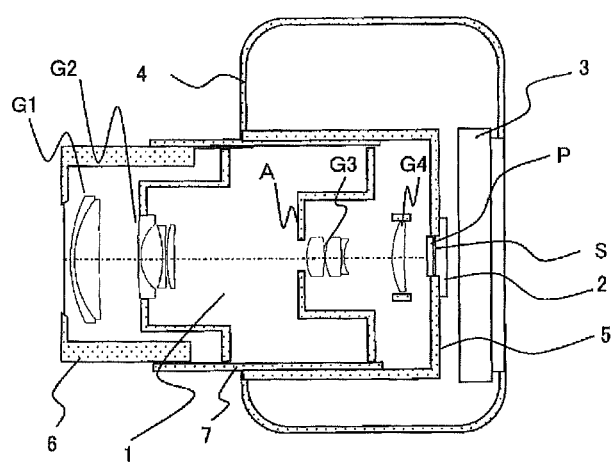
FIG. 25 is a schematic construction diagram of a digital still camera according to Embodiment 9.

FIG. 25 is a schematic construction diagram of a digital still camera according to Embodiment 9. In FIG. 25, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment 1. In FIG. 25, the zoom lens system 1 comprises a first lens unit G1, a second lens unit G2, an aperture diaphragm A, a third lens unit G3, and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the aperture diaphragm A and the third lens unit G3, and the fourth lens unit G4 move to predetermined positions relative to the image sensor 2, so that zooming from a wide-angle limit to a telephoto limit is achieved. The fourth lens unit G4 is movable in an optical axis direction by a motor for focus adjustment.

As such, when the zoom lens system according to Embodiment 1 is employed in a digital still camera, a small digital still camera is obtained that has a high resolution and high capability of compensating the curvature of field and that has a short overall length of lens system at the time of non-use. Here, in the digital still camera shown in FIG. 25, any one of the zoom lens systems according to Embodiments 2 to 8 may be employed in place of the zoom lens system according to Embodiment 1. Further, the optical system of the digital still camera shown in FIG. 25 is applicable also to a digital video camera for moving images. In this case, moving images with high resolution can be acquired in addition to still images.

Here, the digital still camera according to the present Embodiment 9 has been described for a case that the employed zoom lens system 1 is a zoom lens system according to Embodiments 1 to 8. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments 1 to 8.

Further, Embodiment 9 has been described for a case that the zoom lens system is applied to a lens barrel of so-called barrel retraction construction. However, the present invention is not limited to this. For example, the zoom lens system may be applied to a lens barrel of so-called bending configuration where a prism having an internal reflective surface or a front surface reflective mirror is arranged at an arbitrary position within the first lens unit G1 or the like. Further, in Embodiment 9, the zoom lens system may be applied to a so-called sliding lens barrel in which a part of the lens units constituting the zoom lens system like the entirety of the second lens unit G2, the entirety of the third lens unit G3, or alternatively a part of the second lens unit G2 or the third lens unit G3 is caused to escape from the optical axis at the time of barrel retraction.

Further, an imaging device comprising a zoom lens system according to Embodiments 1 to 8 described above and an image sensor such as a CCD or a CMOS may be applied to a mobile telephone, a surveillance camera in a surveillance system, a Web camera, a vehicle-mounted camera or the like.

Numerical examples are described below in which the zoom lens systems according to Embodiments 1 to 8 are implemented. As described later, Numerical Examples 1 to 8 correspond to Embodiments 1 to 8, respectively. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1 + \sqrt{1-(1+\kappa)(h/r)^2}} + A4h^4 + A6h^6 + A8h^8 + A10h^{10} + A12h^{12} + A14h^{14}$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

FIGS. 2, 5, 8, 11, 14, 17, 20 and 23 are longitudinal aberration diagrams of an infinity in-focus condition of the zoom lens systems according to Numerical Examples 1, 2, 3, 4, 5, 6, 7 and 8, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each FIG., indicated as F), and the solid line, the short dash line, the long dash line, the long-short dash line and the long-short short dash line indicate the characteristics to the d-line, the F-line, the C-line, the g-line and the e-line, respectively. In each astigmatism diagram, the vertical axis indicates the image height (in each FIG., indicated as H), and the solid line and the dash line indicate the characteristics to the sagittal plane (in each FIG., indicated as "s") and the meridional plane (in each FIG., indicated as "m"), respectively. In each distortion diagram, the vertical axis indicates the image height (in each FIG., indicated as H).

FIGS. 3, 6, 9, 12, 15, 18, 21 and 24 are lateral aberration diagrams in a basic state where image blur compensation is not performed and in a blur compensation state of the zoom lens systems according to Numerical Examples 1, 2, 3, 4, 5, 6, 7 and 8, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the entirety of the third lens unit G3 is moved by a predetermined amount in a direction perpendicular to the optical axis at a telephoto limit. Among the lateral aberration diagrams of a basic state, the upper part shows the lateral aberration at an image point of 75% of the maximum image height, the middle part shows the lateral aberration at the axial image point, and the lower part shows the lateral aberration at an image point of −75% of the maximum image height. Among the lateral aberration diagrams of an image blur compensation state, the upper part shows the lateral aberration at an image point of 75% of the maximum image height, the middle part shows the lateral aberration at the axial image point, and the lower part shows the lateral aberration at an image point of −75% of the maximum image height. In each lateral aberration diagram, the horizontal axis indicates the distance from the principal ray on the pupil surface, and the solid line, the short dash line, the long dash line, the long-short dash line and the long-short short dash line indicate the characteristics to the d-line, the F-line, the C-line, the g-line and the e-line, respectively. In each lateral aberration diagram, the meridional plane is adopted as the plane containing the optical axis of the first lens unit G1.

Here, in the zoom lens system according to each numerical example, the amount of movement of the entirety of the third lens unit G3 in a direction perpendicular to the optical axis in an image blur compensation state at a telephoto limit is as follows.

| Example | Amount of movement (mm) |
|---|---|
| 1 | 0.093 |
| 2 | 0.094 |
| 3 | 0.097 |
| 4 | 0.088 |
| 5 | 0.093 |
| 6 | 0.093 |
| 7 | 0.079 |
| 8 | 0.079 |

Here, when the shooting distance is infinity, at a telephoto limit, the amount of image decentering in a case that the zoom lens system inclines by 0.3° is equal to the amount of image decentering in a case that the entirety of the third lens unit G3 displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +75% image point and the lateral aberration at the −75% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

NUMERICAL EXAMPLE 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data.

TABLE 1

(Surface data)

| Surface number | r | d | nd | vd |
|---|---|---|---|---|
| Object surface | ∞ | | | |
| 1 | 17.56640 | 0.50000 | 2.00272 | 19.3 |
| 2 | 11.94930 | 0.01000 | 1.56732 | 42.8 |
| 3 | 11.94930 | 3.12610 | 1.72342 | 38.0 |
| 4 | 178.34980 | Variable | | |
| 5* | 167.24460 | 0.30000 | 1.80470 | 41.0 |
| 6* | 5.62480 | 2.78260 | | |
| 7 | −13.17190 | 0.40000 | 1.77250 | 49.6 |
| 8 | 144.97740 | 0.15000 | | |
| 9 | 14.94940 | 0.95490 | 1.94595 | 18.0 |
| 10 | 191.90840 | Variable | | |
| 11(Diaphragm) | ∞ | 0.62500 | | |
| 12* | 5.55950 | 2.27700 | 1.51776 | 69.9 |
| 13* | −13.08710 | 0.15000 | | |
| 14 | 5.45400 | 1.94510 | 1.69680 | 55.5 |
| 15 | −42.83440 | 0.01000 | 1.56732 | 42.8 |
| 16 | −42.83440 | 0.30000 | 1.90366 | 31.3 |
| 17 | 3.83600 | Variable | | |
| 18* | 9.25040 | 1.53010 | 1.54410 | 56.1 |
| 19* | 34.65240 | Variable | | |

TABLE 1-continued (Surface data)

| Surface number | r | d | nd | vd |
|---|---|---|---|---|
| 20 | ∞ | 0.78000 | 1.51680 | 64.2 |
| 21 | ∞ | (BF) | | |
| Image surface | ∞ | | | |

TABLE 2

(Aspherical data)

Surface No. 5

K = 0.00000E+00, A4 = 2.85942E−04, A6 = −5.17854E−06,
A8 = 2.24117E−08 A10 = 0.00000E+00, A12 = 0.00000E+00

Surface No. 6

K = 0.00000E+00, A4 = 2.77898E−04, A6 = 4.49772E−06,
A8 = 1.43029E−06 A10 = −6.60172E−08, A12 = 1.27352E−09

Surface No. 12

K = 0.00000E+00, A4 = −1.94634E−04, A6 = 1.70170E−05,
A8 = 5.80854E−06 A10 = −3.06144E−10, A12 = 0.00000E+00

Surface No. 13

K = 0.00000E+00, A4 = 1.02931E−03, A6 = 4.78170E−05,
A8 = 2.67269E−06 A10 = 5.65734E−07, A12 = 0.00000E+00

Surface No. 18

K = 0.00000E+00, A4 = −4.58527E−04, A6 = 4.00892E−05,
A8 = −2.59597E−06 A10 = 6.99106E−08, A12 = −1.44628E−09

Surface No. 19

K = 0.00000E+00, A4 = −4.48892E−04, A6 = 3.47638E−05,
A8 = −1.78782E−06 A10 = 8.14501E−09, A12 = 0.00000E+00

TABLE 3

(Various data)

Zooming ratio 7.53632

| | Wide-angle limit | Middle position | Telephoto limit |
|---|---|---|---|
| Focal length | 5.1747 | 14.2138 | 38.9984 |
| F-number | 3.37355 | 4.47770 | 6.13230 |
| View angle | 39.6790 | 15.4588 | 5.5991 |
| Image height | 3.7000 | 3.9000 | 3.9000 |
| Overall length of lens system | 38.2712 | 40.9601 | 50.9472 |
| BF | 0.58501 | 0.56483 | 0.53711 |
| d4 | 0.3000 | 7.1634 | 14.5565 |
| d10 | 13.7483 | 4.4348 | 0.3887 |
| d17 | 5.4473 | 7.3188 | 16.0334 |
| d19 | 2.3498 | 5.6375 | 3.5907 |
| Entrance pupil position | 10.0430 | 22.6532 | 49.0778 |
| Exit pupil position | −15.0986 | −23.0580 | −91.1023 |
| Front principal points position | 13.5103 | 28.3146 | 71.4980 |
| Back principal points position | 33.0965 | 26.7464 | 11.9488 |

Single lens data

| Lens element | Initial surface number | Focal length |
|---|---|---|
| 1 | 1 | −39.0060 |
| 2 | 3 | 17.5655 |
| 3 | 5 | −7.2392 |
| 4 | 7 | −15.6136 |

TABLE 3-continued (Various data)

| Lens element | Initial surface number | Focal length |
|---|---|---|
| 5 | 9 | 17.0939 |
| 6 | 12 | 7.8638 |
| 7 | 14 | 7.0599 |
| 8 | 16 | −3.8842 |
| 9 | 18 | 22.7104 |

Zoom lens unit data

| Lens unit | Initial surface No. | Focal length | Overall length of lens unit | Front principal points position | Back principal points position |
|---|---|---|---|---|---|
| 1 | 1 | 33.01250 | 3.63610 | −0.46845 | 1.12288 |
| 2 | 5 | −7.06018 | 4.58750 | 0.12808 | 0.82514 |
| 3 | 11 | 9.42972 | 5.30710 | −2.72888 | 0.91457 |
| 4 | 18 | 22.71044 | 1.53010 | −0.35336 | 0.20640 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.30682 | −0.43723 | −0.80646 |
| 3 | 11 | −0.64683 | −1.52445 | −1.98670 |
| 4 | 18 | 0.78984 | 0.64597 | 0.73731 |

NUMERICAL EXAMPLE 2

Figure 4:
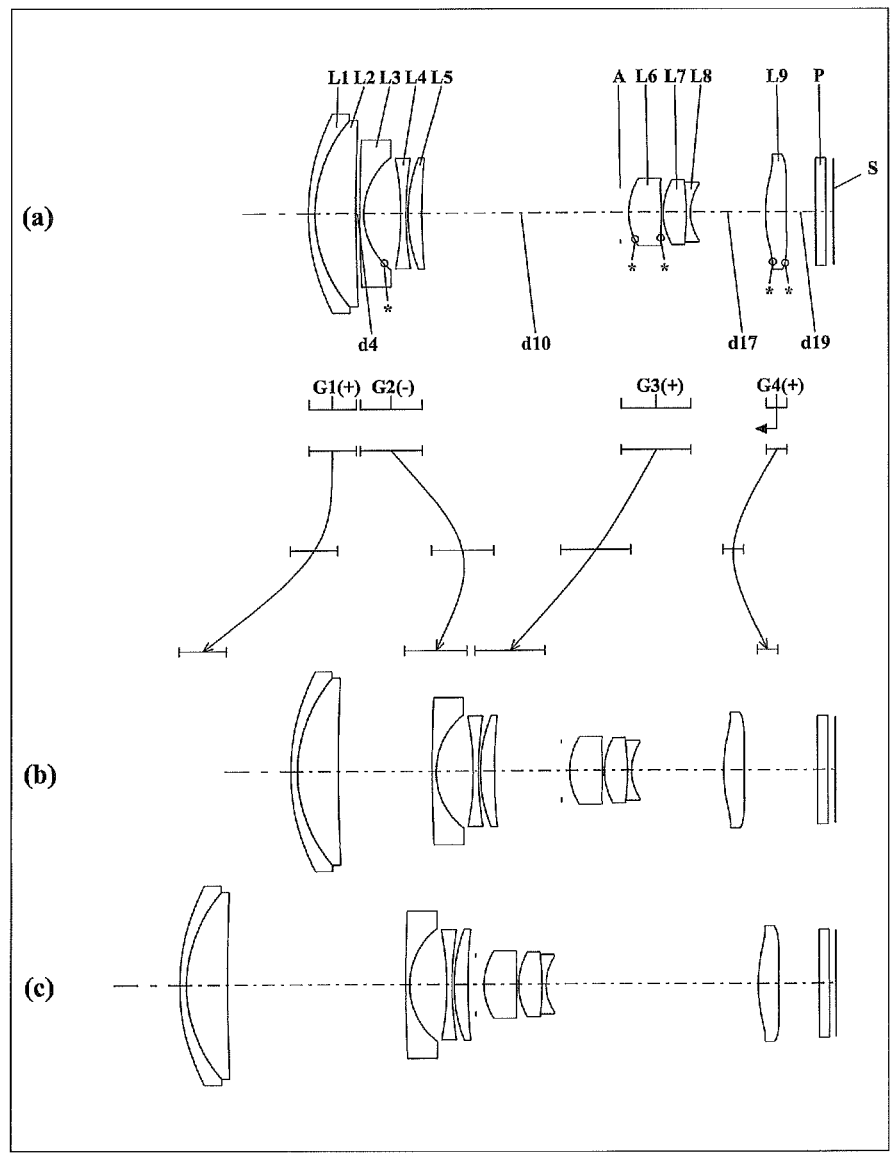
FIG. 4 is a lens arrangement diagram showing an infinity in-focus condition of a zoom lens system according to Embodiment 2 (Example 2).
Figure 5:
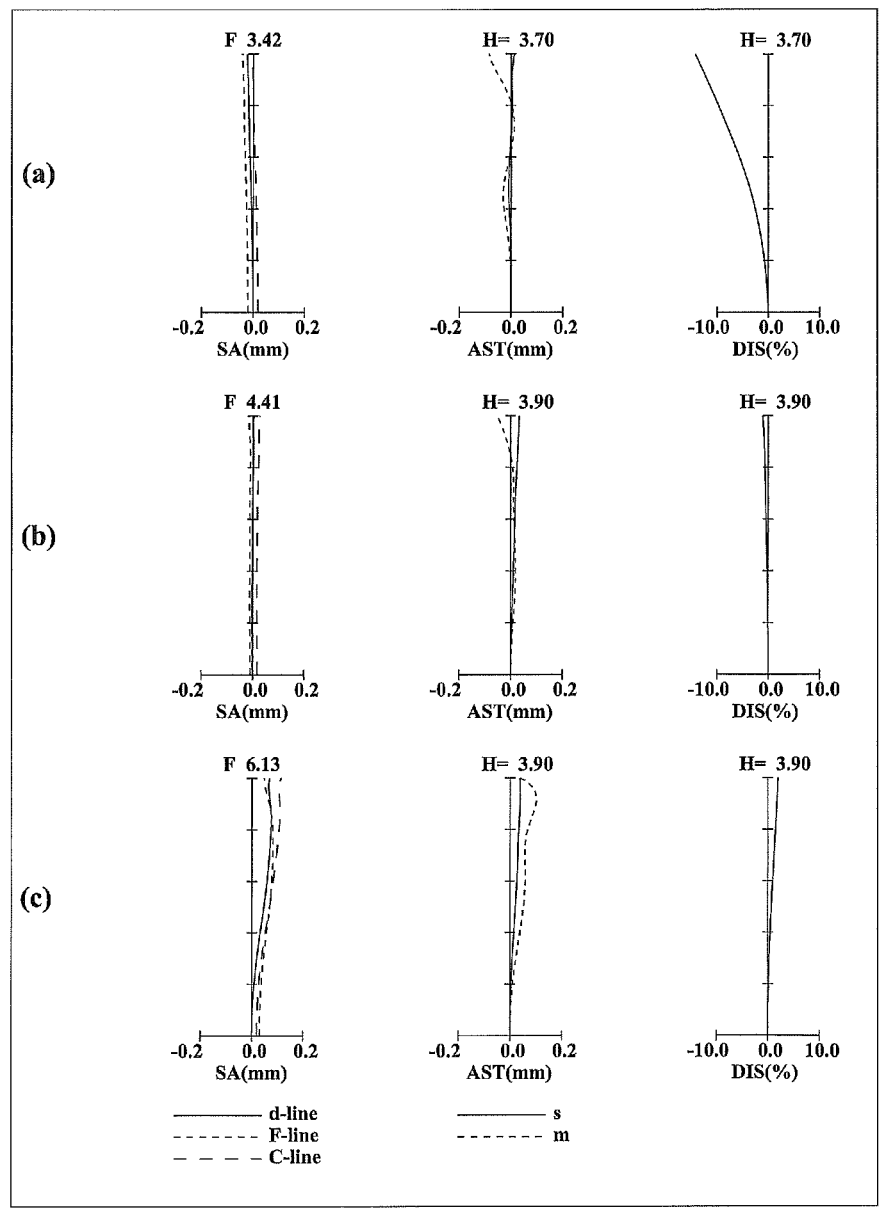
FIG. 5 is a longitudinal aberration diagram of an infinity in-focus condition of a zoom lens system according to Example 2.
Figure 6:
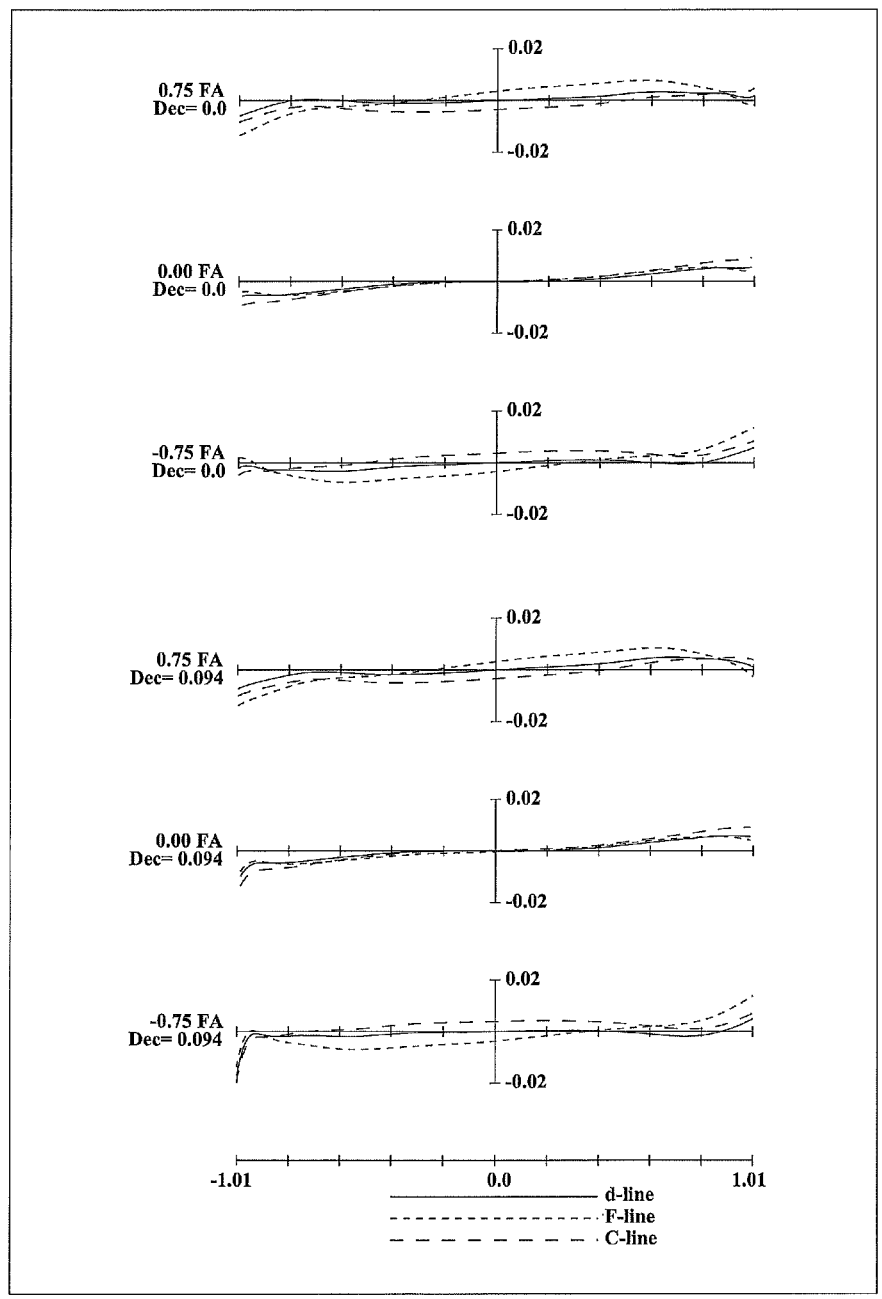
FIG. 6 is a lateral aberration diagram of a zoom lens system according to Example 2 at a telephoto limit in a basic state where image blur compensation is not performed and in a blur compensation state.

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows various data.

TABLE 4

(Surface data)

| Surface number | r | d | nd | vd |
|---|---|---|---|---|
| Object surface | ∞ | | | |
| 1 | 16.29520 | 0.50000 | 1.92286 | 20.9 |
| 2 | 10.77890 | 0.01000 | 1.56732 | 42.8 |
| 3 | 10.77890 | 3.06800 | 1.70154 | 41.1 |
| 4 | 148.37060 | Variable | | |
| 5 | 115.96120 | 0.30000 | 1.80470 | 41.0 |
| 6* | 5.39210 | 2.79390 | | |
| 7 | −22.01530 | 0.40000 | 1.72916 | 54.7 |
| 8 | 25.44450 | 0.15000 | | |
| 9 | 11.54110 | 1.03550 | 2.00272 | 19.3 |
| 10 | 39.19580 | Variable | | |
| 11(Diaphragm) | ∞ | 0.62500 | | |
| 12* | 5.07160 | 2.46070 | 1.51845 | 70.0 |
| 13* | −23.19740 | 0.15000 | | |
| 14 | 4.98540 | 1.74460 | 1.67270 | 32.2 |
| 15 | −19.35980 | 0.01000 | 1.56732 | 42.8 |
| 16 | −19.35980 | 0.30000 | 1.84666 | 23.8 |
| 17 | 3.71460 | Variable | | |
| 18* | 10.64510 | 1.55240 | 1.52996 | 55.8 |
| 19* | 70.99170 | Variable | | |
| 20 | ∞ | 0.78000 | 1.51680 | 64.2 |
| 21 | ∞ | (BF) | | |
| Image surface | ∞ | | | |

TABLE 5

(Aspherical data)

Surface No. 6

K = 0.00000E+00, A4 = 6.25974E−05, A6 = −3.75623E−05,
A8 = 6.18415E−06 A10 = −5.10504E−07, A12 = 2.05297E−08,
A14 = −3.34330E−10

TABLE 5-continued (Aspherical data)

Surface No. 12

K = 1.20353E+00, A4 = −8.04162E−04, A6 = −6.13735E−05,
A8 = 3.71526E−05 A10 = −1.30145E−05, A12 = 2.02836E−06,
A14 = −1.21635E−07
Surface No. 13

K = 0.00000E+00, A4 = 1.82446E−03, A6 = 7.17589E−05,
A8 = 5.00920E−05 A10 = −1.70199E−05, A12 = 3.15885E−06,
A14 = −1.96339E−07
Surface No. 18

K = 0.00000E+00, A4 = −4.13378E−04, A6 = −4.29362E−05,
A8 = 2.54503E−06 A10 = 1.47825E−07, A12 = −2.99676E−08,
A14 = 8.23331E−10
Surface No. 19

K = 0.00000E+00, A4 = −4.80811E−04, A6 = −5.88279E−05,
A8 = 4.96823E−06 A10 = −1.11215E−07, A12 = −1.58118E−08,
A14 = 5.54189E−10

TABLE 6

(Various data)

Zooming ratio 7.52984

|  | Wide-angle limit | Middle position | Telephoto limit |
|---|---|---|---|
| Focal length | 5.1761 | 14.2159 | 38.9750 |
| F-number | 3.42225 | 4.40672 | 6.12803 |
| View angle | 39.8157 | 15.4979 | 5.6032 |
| Image height | 3.7000 | 3.9000 | 3.9000 |
| Overall length of lens system | 39.6984 | 41.1345 | 49.5522 |
| BF | 0.59240 | 0.57053 | 0.49552 |
| d4 | 0.3000 | 7.0803 | 13.4662 |
| d10 | 15.0185 | 5.0670 | 0.6030 |
| d17 | 5.6821 | 6.9912 | 16.0660 |
| d19 | 2.2253 | 5.5454 | 3.0414 |
| Entrance pupil position | 10.4737 | 23.8313 | 46.8965 |
| Exit pupil position | −15.6682 | −22.2100 | −86.5111 |
| Front principal points position | 14.0021 | 29.1759 | 68.4125 |
| Back principal points position | 34.5223 | 26.9186 | 10.5773 |

Single lens data

| Lens element | Initial surface number | Focal length |
|---|---|---|
| 1 | 1 | −36.0717 |
| 2 | 3 | 16.4173 |
| 3 | 5 | −7.0360 |
| 4 | 7 | −16.1298 |
| 5 | 9 | 16.0129 |
| 6 | 12 | 8.2731 |
| 7 | 14 | 6.0683 |
| 8 | 16 | −3.6592 |
| 9 | 18 | 23.4212 |

Zoom lens unit data

| Lens unit | Initial surface No. | Focal length | Overall length of lens unit | Front principal points position | Back principal points position |
|---|---|---|---|---|---|
| 1 | 1 | 31.19710 | 3.57800 | −0.47074 | 1.06615 |
| 2 | 5 | −7.11233 | 4.67940 | 0.13288 | 0.93511 |
| 3 | 11 | 9.66720 | 5.29030 | −2.77684 | 0.81521 |
| 4 | 18 | 23.42117 | 1.55240 | −0.17741 | 0.36929 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.33644 | −0.49530 | −0.89196 |
| 3 | 11 | −0.61092 | −1.38057 | −1.80375 |
| 4 | 18 | 0.80722 | 0.66640 | 0.77652 |

NUMERICAL EXAMPLE 3

Figure 7:
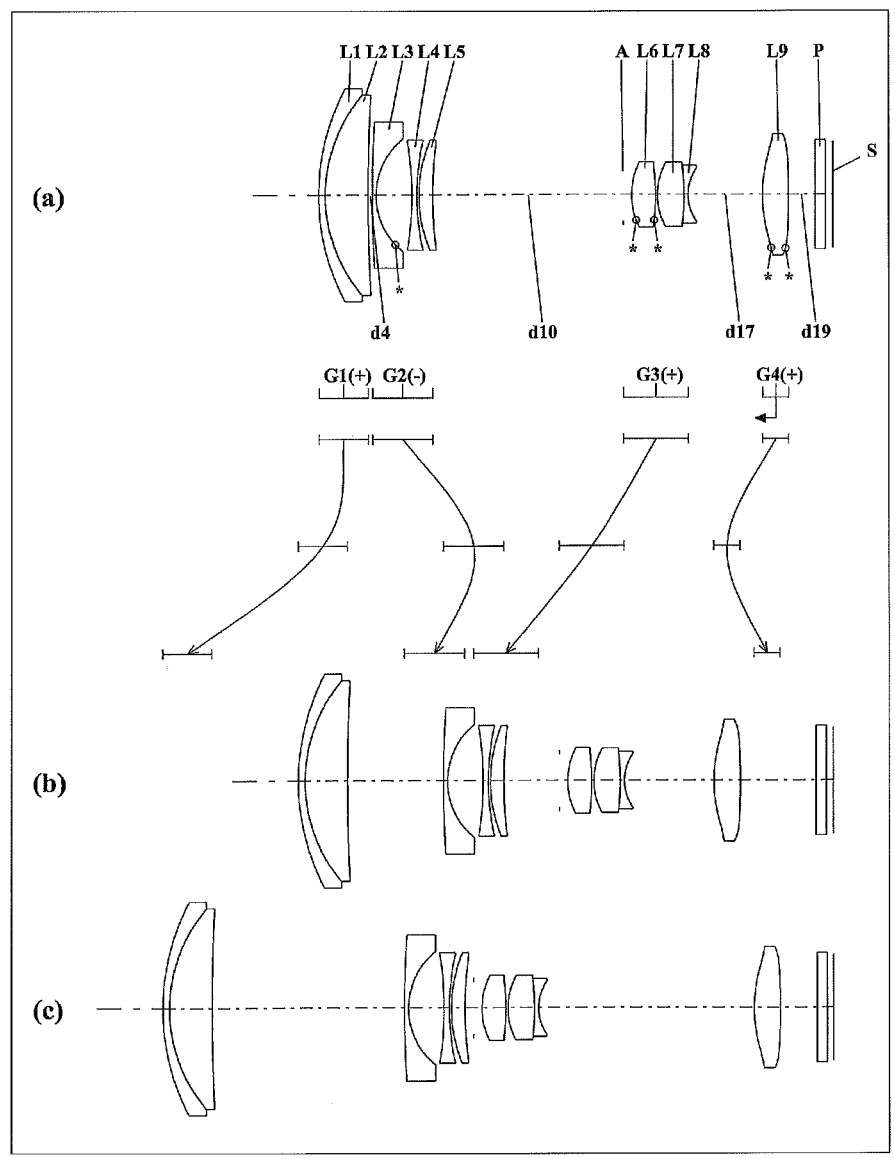
FIG. 7 is a lens arrangement diagram showing an infinity in-focus condition of a zoom lens system according to Embodiment 3 (Example 3).
Figure 8:
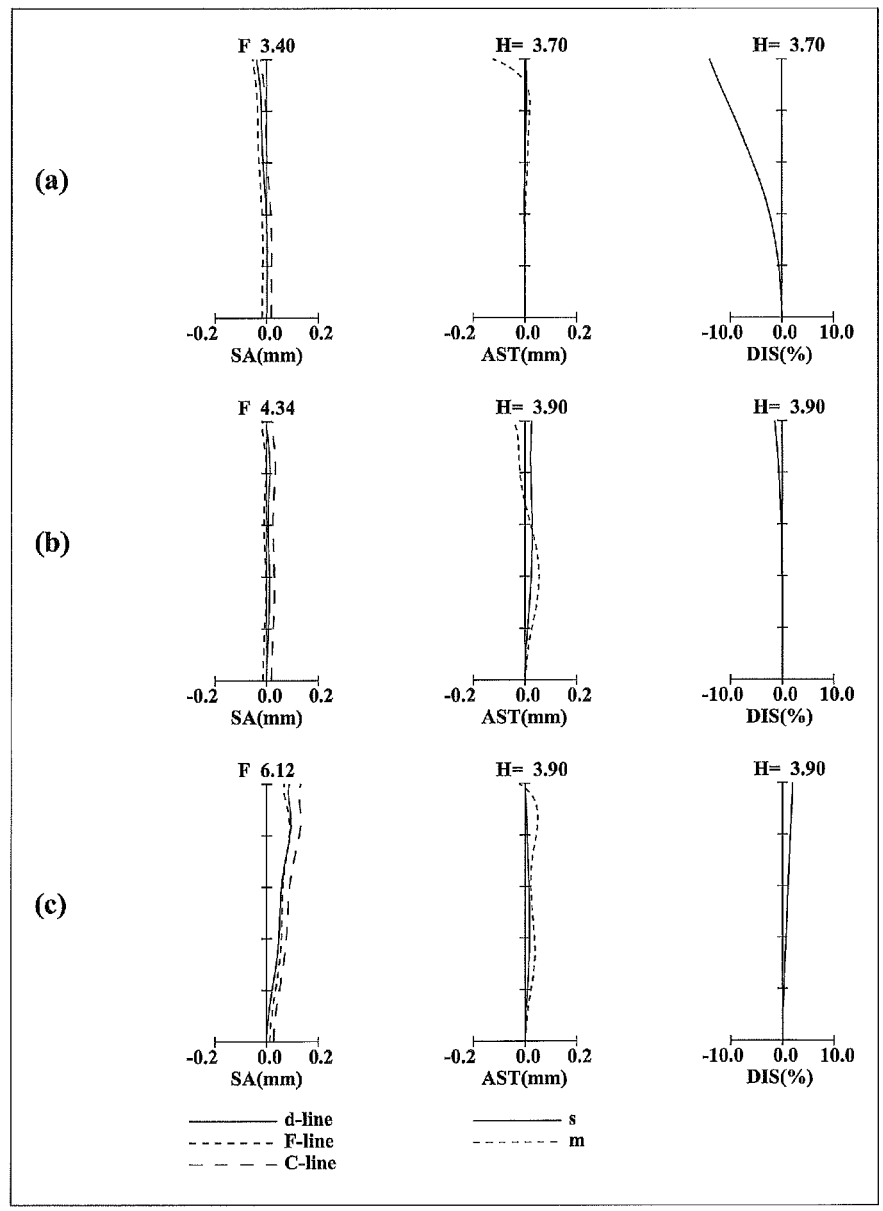
FIG. 8 is a longitudinal aberration diagram of an infinity in-focus condition of a zoom lens system according to Example 3.
Figure 9:
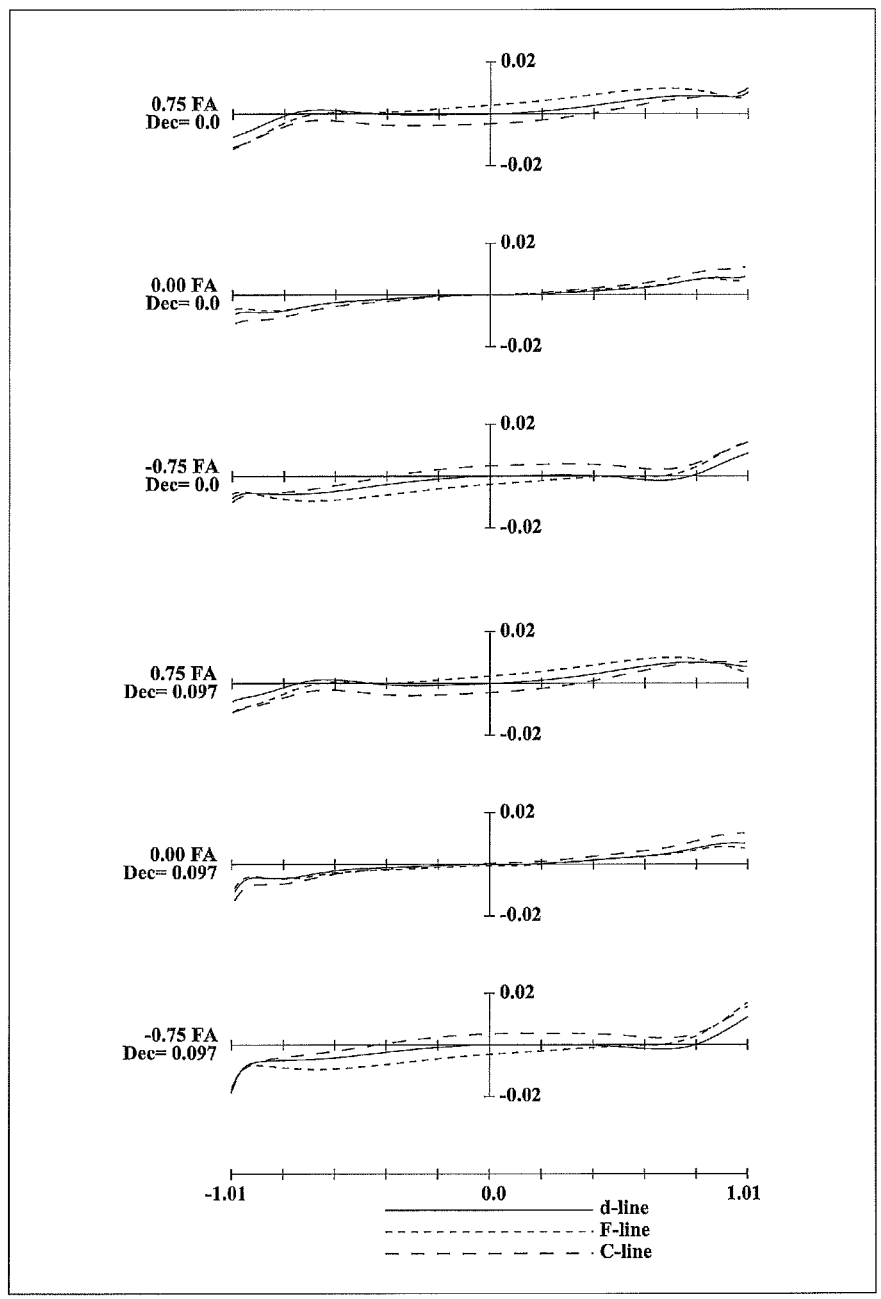
FIG. 9 is a lateral aberration diagram of a zoom lens system according to Example 3 at a telephoto limit in a basic state where image blur compensation is not performed and in a blur compensation state.

The zoom lens system of Numerical Example 3 corresponds to Embodiment 3 shown in FIG. 7. Table 7 shows the surface data of the zoom lens system of Numerical Example 3. Table 8 shows the aspherical data. Table 9 shows various data.

TABLE 7

(Surface data)

| Surface number | r | d | nd | νd |
|---|---|---|---|---|
| Object surface | ∞ | | | |
| 1 | 17.32600 | 0.50000 | 2.00272 | 19.3 |
| 2 | 11.73080 | 0.01000 | 1.56732 | 42.8 |
| 3 | 11.73080 | 3.20820 | 1.72342 | 38.0 |
| 4 | 158.28280 | Variable | | |
| 5 | 87.36880 | 0.30000 | 1.80470 | 41.0 |
| 6* | 5.58700 | 2.67160 | | |
| 7 | −26.10120 | 0.40000 | 1.72916 | 54.7 |
| 8 | 18.99140 | 0.15000 | | |
| 9 | 10.79870 | 1.02790 | 2.00272 | 19.3 |
| 10 | 33.44110 | Variable | | |
| 11(Diaphragm) | ∞ | 0.62500 | | |
| 12* | 5.53260 | 1.81860 | 1.51845 | 70.0 |
| 13* | −14.34490 | 0.15000 | | |
| 14 | 5.14100 | 1.99320 | 1.67270 | 32.2 |
| 15 | −21.14760 | 0.01000 | 1.56732 | 42.8 |
| 16 | −21.14760 | 0.30000 | 1.84666 | 23.8 |
| 17 | 3.53780 | Variable | | |
| 18* | 10.62390 | 1.98570 | 1.52996 | 55.8 |
| 19* | −100.00000 | Variable | | |
| 20 | ∞ | 0.78000 | 1.51680 | 64.2 |
| 21 | ∞ | (BF) | | |
| Image surface | ∞ | | | |

TABLE 8

(Aspherical data)

Surface No. 6

K = 0.00000E+00, A4 = 7.50057E−05, A6 = −2.66662E−05,
A8 = 6.89778E−06 A10 = −6.99029E−07, A12 = 3.29899E−08,
A14 = −5.88238E−10
Surface No. 12

K = 1.21628E+00, A4 = −1.04113E−03, A6 = 4.61226E−05,
A8 = 2.66828E−06 A10 = −7.06023E−06, A12 = 1.78318E−06,
A14 = −1.28262E−07
Surface No. 13

K = 0.00000E+00, A4 = 9.97876E−04, A6 = 2.29302E−05,
A8 = 5.89349E−05 A10 = −2.25235E−05, A12 = 4.06752E−06,
A14 = −2.51060E−07

TABLE 8-continued (Aspherical data)

Surface No. 18

K = 0.00000E+00, A4 = −4.76344E−04, A6 = 4.20634E−05,
A8 = −4.94466E−06 A10 = 3.54004E−07, A12 = −1.83982E−08,
A14 = 3.51067E−10

Surface No. 19

K = 0.00000E+00, A4 = −2.96228E−04, A6 = −2.32396E−05,
A8 = 2.63333E−06 A10 = −1.45674E−07, A12 = −1.35053E−09,
A14 = 1.23193E−10

TABLE 9

(Various data)

Zooming ratio 7.51511

|  | Wide-angle limit | Middle position | Telephoto limit |
|---|---|---|---|
| Focal length | 5.1815 | 14.2154 | 38.9393 |
| F-number | 3.40302 | 4.33636 | 6.12376 |
| View angle | 39.7253 | 15.5496 | 5.6096 |
| Image height | 3.7000 | 3.9000 | 3.9000 |
| Overall length of lens system | 38.8308 | 40.4147 | 50.6754 |
| BF | 0.59705 | 0.56284 | 0.48333 |
| d4 | 0.3000 | 7.2154 | 14.5362 |
| d10 | 14.4163 | 4.2071 | 0.6423 |
| d17 | 5.5987 | 6.7856 | 16.3276 |
| d19 | 1.9885 | 5.7136 | 2.7558 |
| Entrance pupil position | 10.5463 | 23.0724 | 49.9317 |
| Exit pupil position | −17.3747 | −25.2062 | 1072.6476 |
| Front principal points position | 14.2338 | 29.4459 | 90.2851 |
| Back principal points position | 33.6493 | 26.1993 | 11.7362 |

Single lens data

| Lens element | Initial surface number | Focal length |
|---|---|---|
| 1 | 1 | −37.9235 |
| 2 | 3 | 17.3544 |
| 3 | 5 | −7.4294 |
| 4 | 7 | −15.0199 |
| 5 | 9 | 15.5520 |
| 6 | 12 | 7.9495 |
| 7 | 14 | 6.3412 |
| 8 | 16 | −3.5598 |
| 9 | 18 | 18.2348 |

Zoom lens unit data

| Lens unit | Initial surface No. | Focal length | Overall length of lens unit | Front principal points position | Back principal points position |
|---|---|---|---|---|---|
| 1 | 1 | 33.11760 | 3.71820 | −0.51620 | 1.11405 |
| 2 | 5 | −7.26627 | 4.54950 | 0.21984 | 1.06335 |
| 3 | 11 | 9.56419 | 4.89680 | −2.97121 | 0.53406 |
| 4 | 18 | 18.23478 | 1.98570 | 0.12542 | 0.80513 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.31972 | −0.45954 | −0.85575 |
| 3 | 11 | −0.63947 | −1.65950 | −1.88367 |
| 4 | 18 | 0.76526 | 0.56285 | 0.72942 |

NUMERICAL EXAMPLE 4

Figure 10:
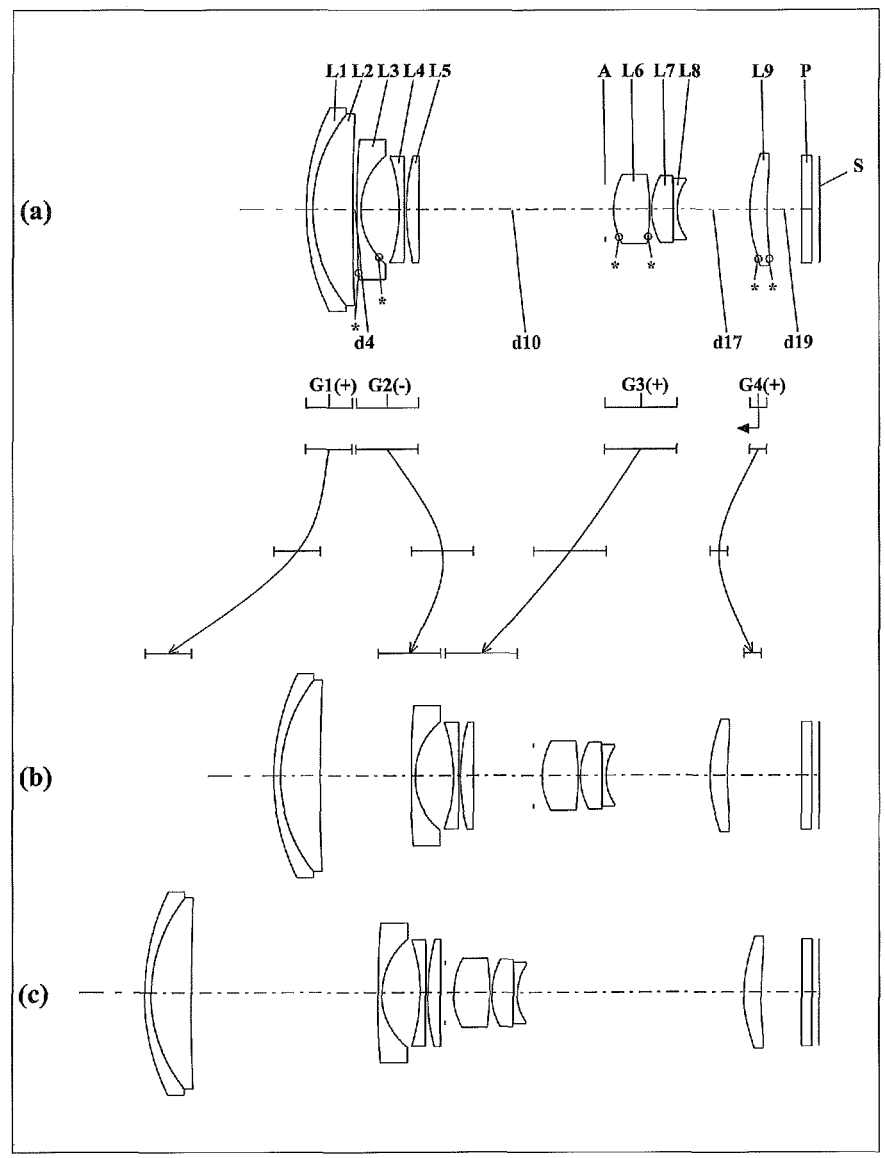
FIG. 10 is a lens arrangement diagram showing an infinity in-focus condition of a zoom lens system according to Embodiment 4 (Example 4).
Figure 11:
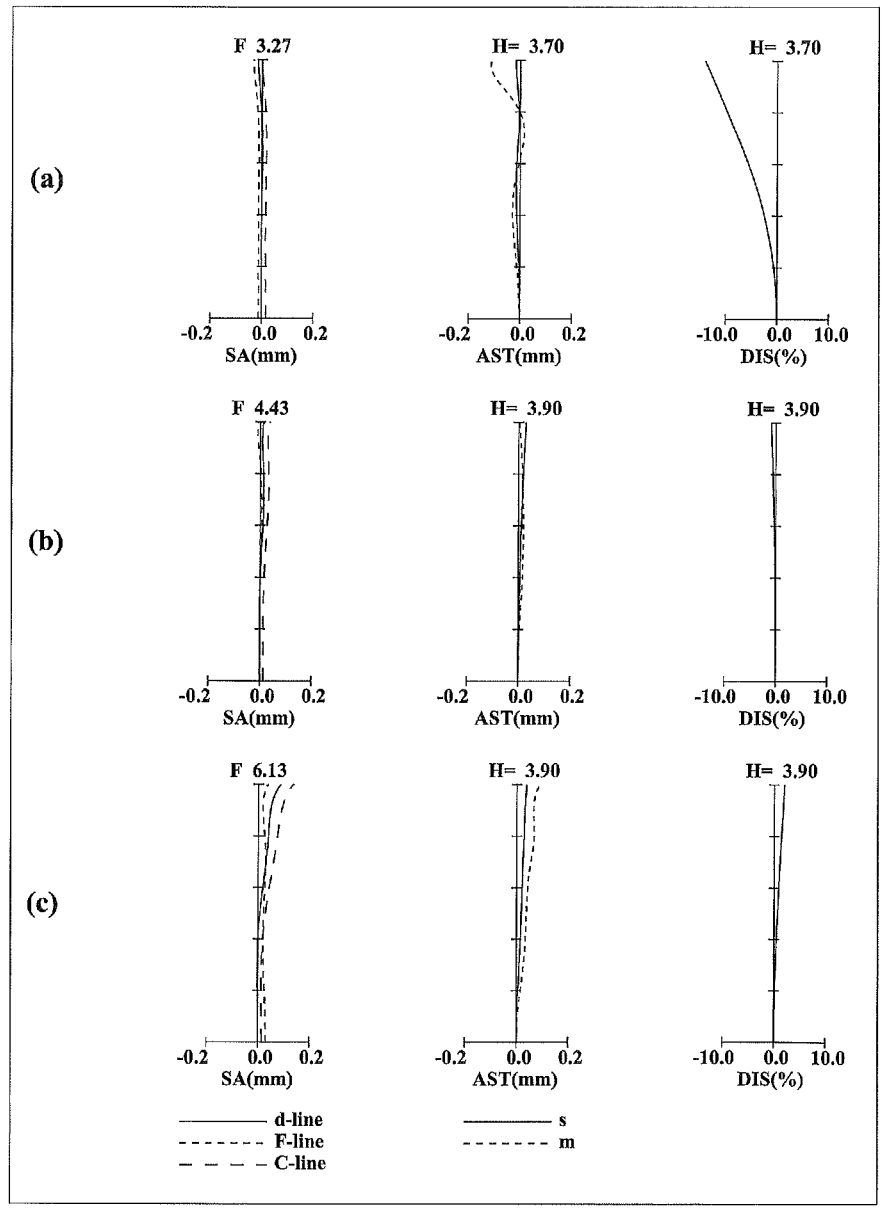
FIG. 11 is a longitudinal aberration diagram of an infinity in-focus condition of a zoom lens system according to Example 4.
Figure 12:
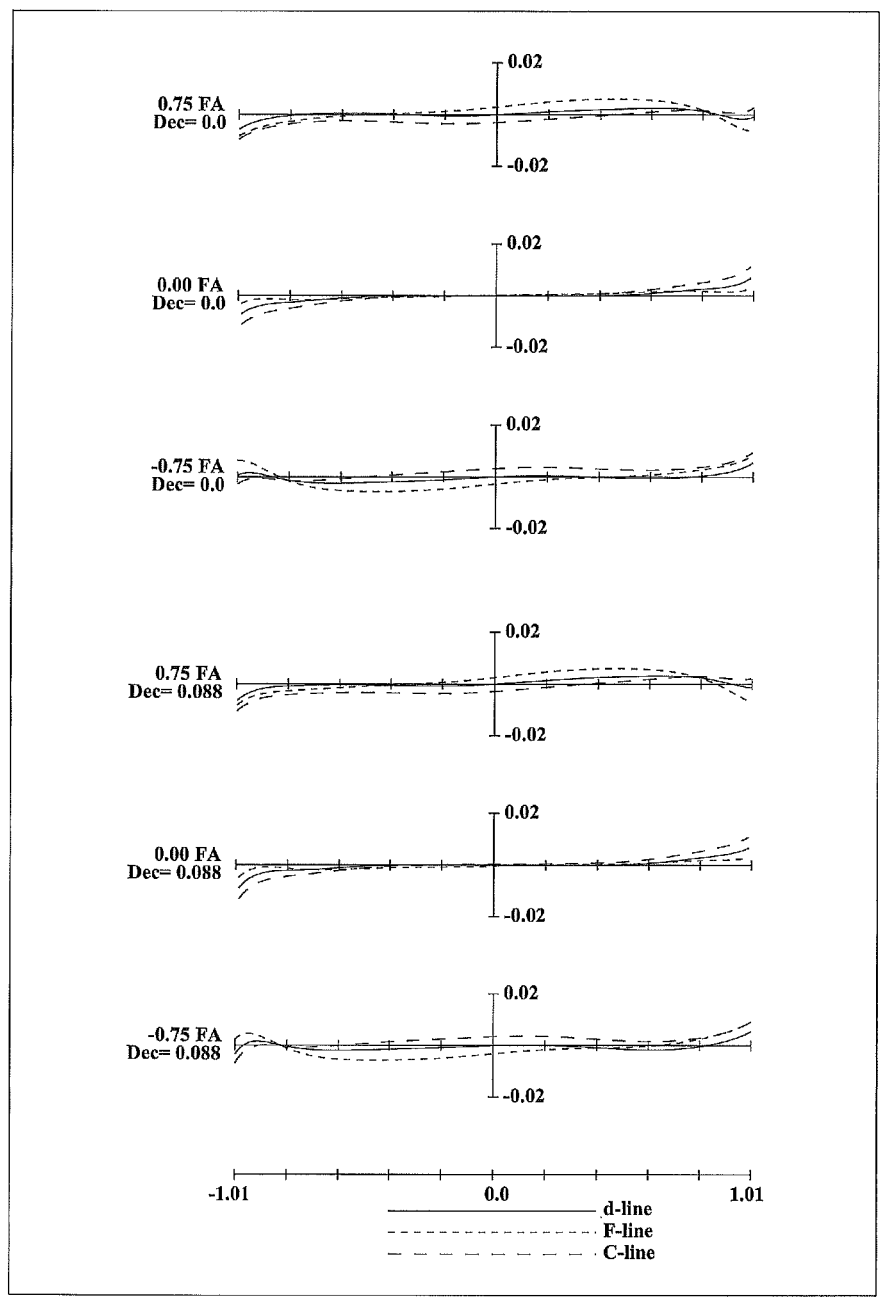
FIG. 12 is a lateral aberration diagram of a zoom lens system according to Example 4 at a telephoto limit in a basic state where image blur compensation is not performed and in a blur compensation state.

The zoom lens system of Numerical Example 4 corresponds to Embodiment 4 shown in FIG. 10. Table 10 shows the surface data of the zoom lens system of Numerical Example 4. Table 11 shows the aspherical data. Table 12 shows various data.

TABLE 10

(Surface data)

| Surface number | r | d | nd | vd |
|---|---|---|---|---|
| Object surface | ∞ | | | |
| 1 | 17.36560 | 0.50000 | 1.92286 | 20.9 |
| 2 | 11.55610 | 0.01000 | 1.56732 | 42.8 |
| 3 | 11.55610 | 3.01640 | 1.70154 | 41.1 |
| 4 | 162.61910 | Variable | | |
| 5* | 158.80080 | 0.30000 | 1.80470 | 41.0 |
| 6* | 5.57520 | 2.86790 | | |
| 7 | −12.44870 | 0.40000 | 1.77250 | 49.6 |
| 8 | −2628.47670 | 0.15000 | | |
| 9 | 16.12720 | 0.96220 | 1.94595 | 18.0 |
| 10 | 934.20150 | Variable | | |
| 11(Diaphragm) | ∞ | 0.62500 | | |
| 12* | 5.45330 | 2.73670 | 1.51776 | 69.9 |
| 13* | −14.04620 | 0.15000 | | |
| 14 | 5.19440 | 1.62480 | 1.69680 | 55.5 |
| 15 | −173.71240 | 0.01000 | 1.56732 | 42.8 |
| 16 | −173.71240 | 0.30000 | 1.90366 | 31.3 |
| 17 | 3.83850 | Variable | | |
| 18* | 9.66050 | 1.32130 | 1.54410 | 56.1 |
| 19* | 25.73030 | Variable | | |
| 20 | ∞ | 0.78000 | 1.51680 | 64.2 |
| 21 | ∞ | (BF) | | |
| Image surface | ∞ | | | |

TABLE 11

(Aspherical data)

Surface No. 5

K = 0.00000E+00, A4 = 2.42181E−04, A6 = −3.85749E−06,
A8 = 1.10420E−08 A10 = 0.00000E+00, A12 = 0.00000E+00

Surface No. 6

K = 0.00000E+00, A4 = 1.93586E−04, A6 = 9.26366E−07,
A8 = 1.44904E−06 A10 = −6.64250E−08, A12 = 1.17457E−09

Surface No. 12

K = 0.00000E+00, A4 = −1.92502E−04, A6 = 6.29467E−06,
A8 = 5.69133E−06 A10 = −1.55884E−07, A12 = 0.00000E+00

Surface No. 13

K = 0.00000E+00, A4 = 1.11837E−03, A6 = 3.77708E−05,
A8 = 3.76088E−06 A10 = 2.73400E−07, A12 = 0.00000E+00

Surface No. 18

K = 0.00000E+00, A4 = −7.36070E−04, A6 = 7.42127E−05,
A8 = −5.78154E−06 A10 = 1.59205E−07, A12 = −1.99102E−09

Surface No. 19

K = 0.00000E+00, A4 = −8.06576E−04, A6 = 7.40302E−05,
A8 = −5.31681E−06 A10 = 9.49137E−08, A12 = 0.00000E+00

TABLE 12

(Various data)

Zooming ratio 7.53616

|  | Wide-angle limit | Middle position | Telephoto limit |
|---|---|---|---|
| Focal length | 5.1746 | 14.2158 | 38.9965 |
| F-number | 3.27449 | 4.43120 | 6.13257 |
| View angle | 39.7293 | 15.4738 | 5.5996 |
| Image height | 3.7000 | 3.9000 | 3.9000 |
| Overall length of lens system | 38.8165 | 41.1973 | 50.9458 |
| BF | 0.58293 | 0.56285 | 0.53571 |
| d4 | 0.3000 | 6.8326 | 14.1400 |
| d10 | 14.0819 | 4.5756 | 0.3503 |
| d17 | 5.4812 | 7.8806 | 17.1145 |
| d19 | 2.6162 | 5.5913 | 3.0510 |
| Entrance pupil position | 10.0300 | 21.6962 | 46.3215 |
| Exit pupil position | −14.6098 | −22.6750 | −66.3050 |
| Front principal points position | 13.4421 | 27.2155 | 62.5665 |
| Back principal points position | 33.6420 | 26.9814 | 11.9493 |

Single lens data

| Lens element | Initial surface number | Focal length |
|---|---|---|
| 1 | 1 | −39.0433 |
| 2 | 3 | 17.5877 |
| 3 | 5 | −7.1867 |
| 4 | 7 | −16.1926 |
| 5 | 9 | 17.3394 |
| 6 | 12 | 7.9684 |
| 7 | 14 | 7.2653 |
| 8 | 16 | −4.1526 |
| 9 | 18 | 27.6281 |

Zoom lens unit data

| Lens unit | Initial surface No. | Focal length | Overall length of lens unit | Front principal points position | Back principal points position |
|---|---|---|---|---|---|
| 1 | 1 | 33.04411 | 3.52640 | −0.45402 | 1.05838 |
| 2 | 5 | −7.13925 | 4.68010 | 0.07753 | 0.74277 |
| 3 | 11 | 9.56317 | 5.44650 | −2.35094 | 1.11897 |
| 4 | 18 | 27.62812 | 1.32130 | −0.49993 | −0.01025 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.30960 | −0.43198 | −0.77438 |
| 3 | 11 | −0.61879 | −1.40179 | −1.89697 |
| 4 | 18 | 0.81740 | 0.71044 | 0.80337 |

NUMERICAL EXAMPLE 5

Figure 13:
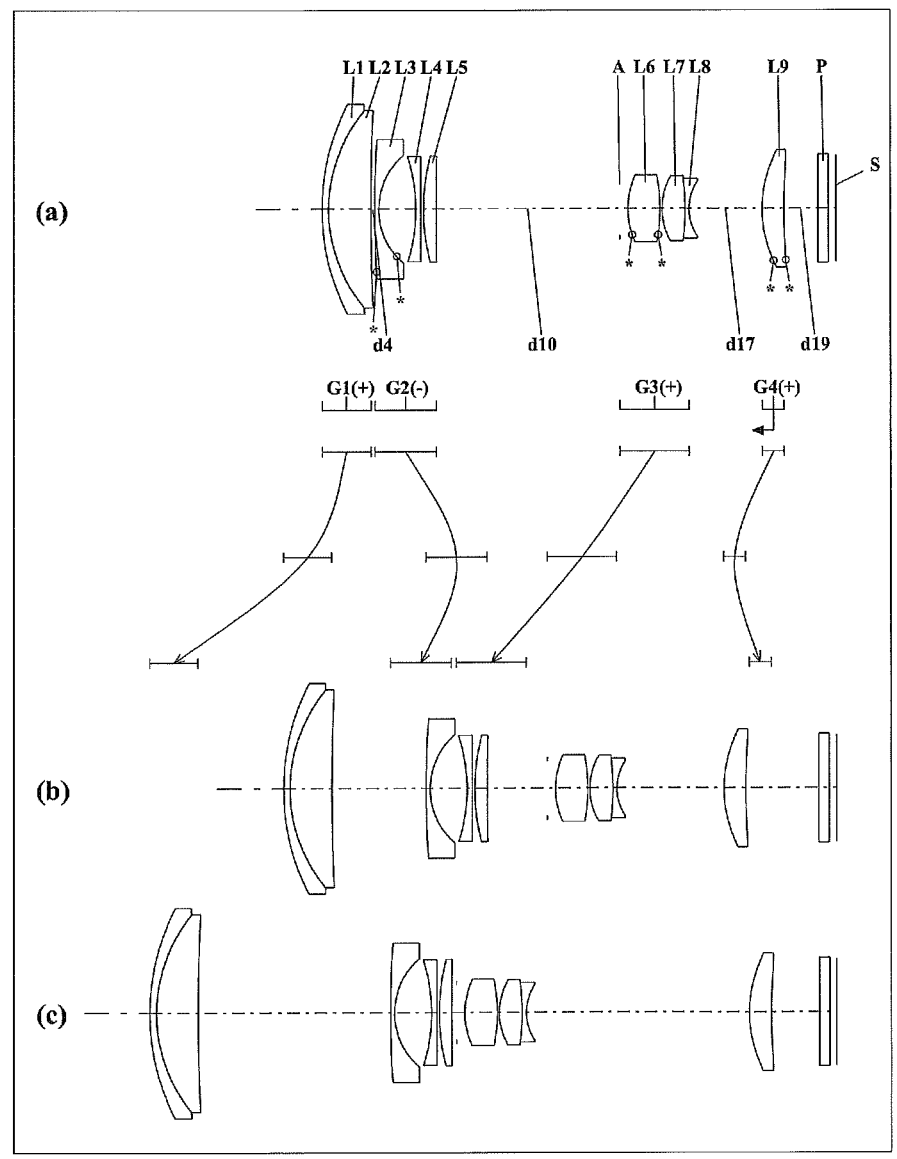
FIG. 13 is a lens arrangement diagram showing an infinity in-focus condition of a zoom lens system according to Embodiment 5 (Example 5).
Figure 14:
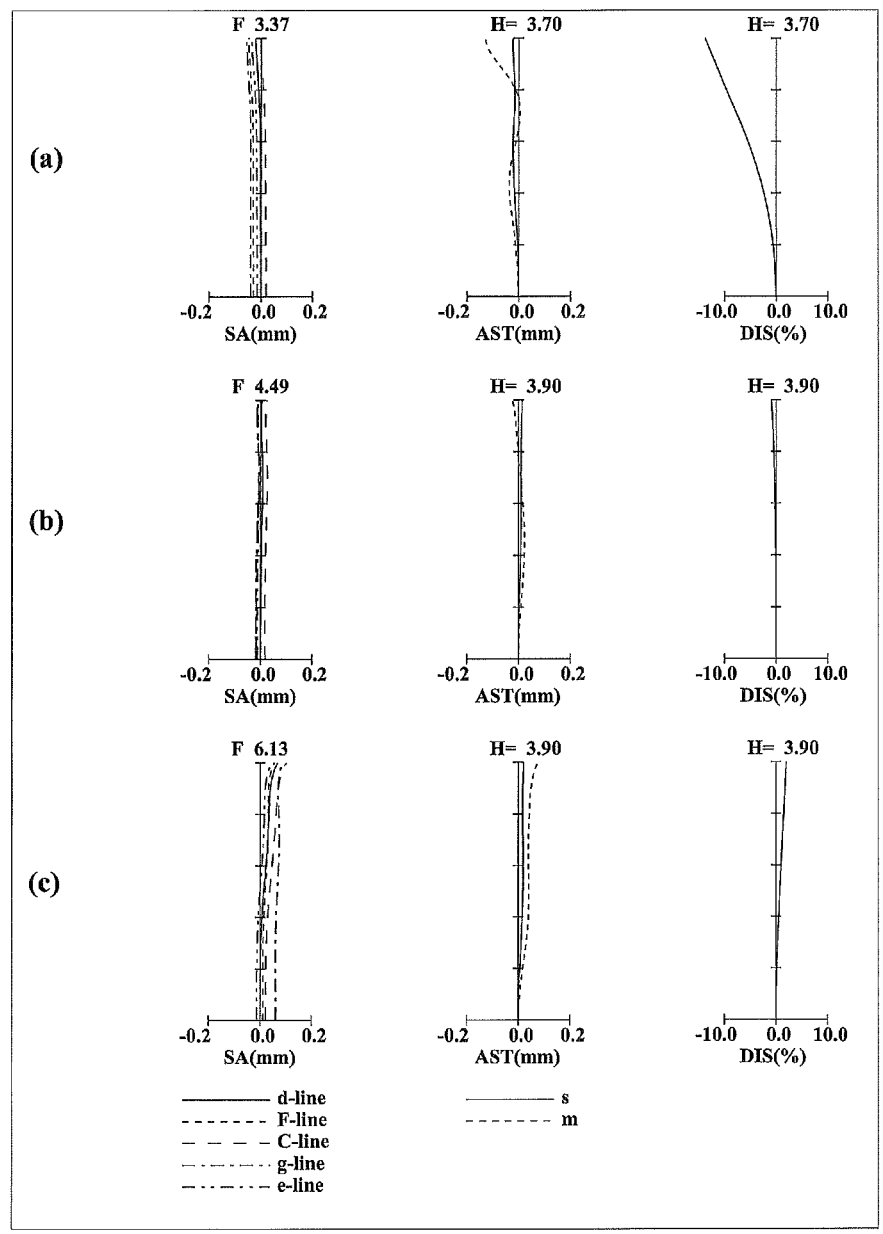
FIG. 14 is a longitudinal aberration diagram of an infinity in-focus condition of a zoom lens system according to Example 5.
Figure 15:
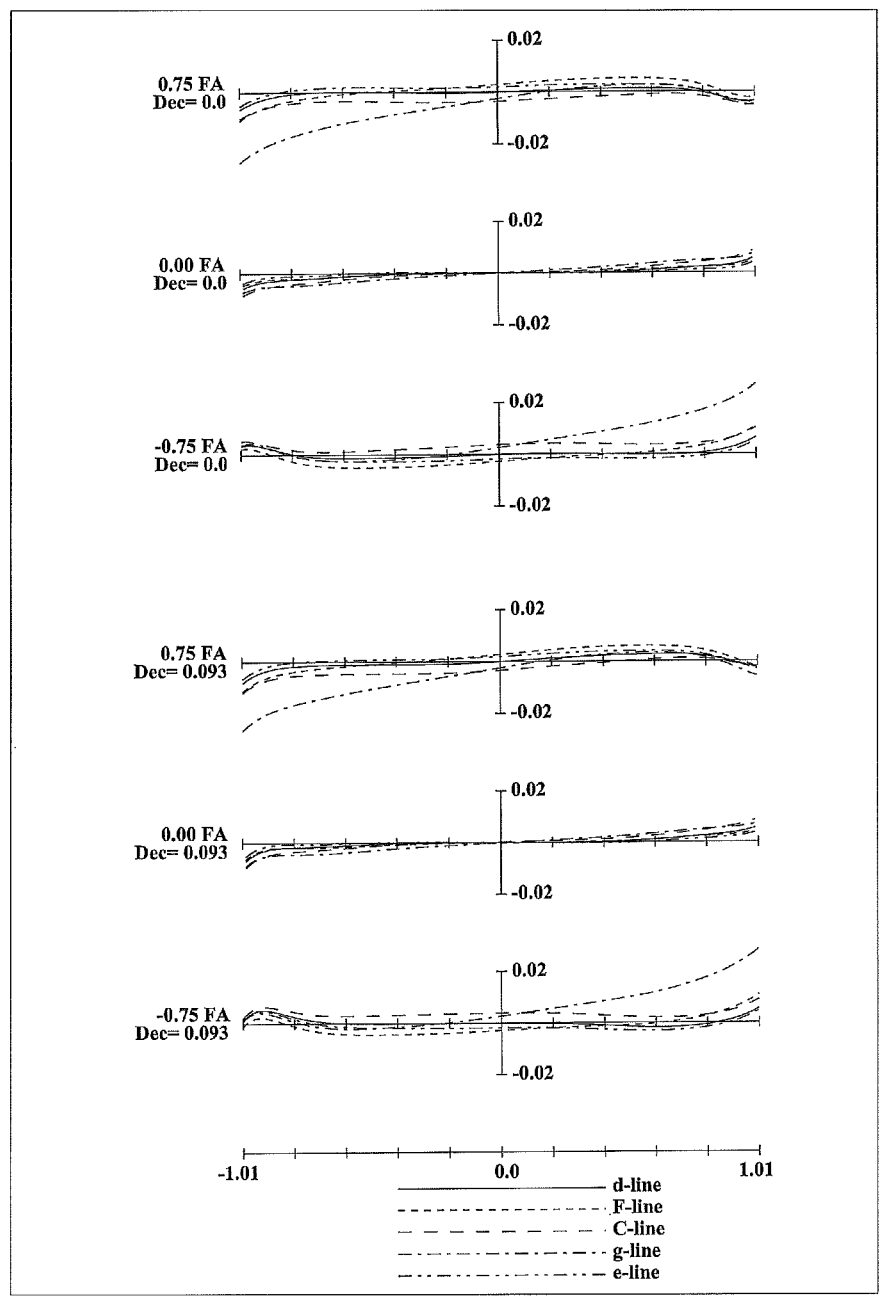
FIG. 15 is a lateral aberration diagram of a zoom lens system according to Example 5 at a telephoto limit in a basic state where image blur compensation is not performed and in a blur compensation state.

The zoom lens system of Numerical Example 5 corresponds to Embodiment 5 shown in FIG. 13. Table 13 shows the surface data of the zoom lens system of Numerical Example 5. Table 14 shows the aspherical data. Table 15 shows various data.

TABLE 13

(Surface data)

| Surface number | r | d | nd | vd |
|---|---|---|---|---|
| Object surface | ∞ | | | |
| 1 | 17.30050 | 0.50000 | 2.00272 | 19.3 |
| 2 | 11.72970 | 0.01000 | 1.56732 | 42.8 |
| 3 | 11.72970 | 3.14200 | 1.72342 | 38.0 |
| 4 | 160.66450 | Variable | | |
| 5* | 167.24300 | 0.30000 | 1.80470 | 41.0 |
| 6* | 5.52920 | 2.80010 | | |
| 7 | −13.20310 | 0.40000 | 1.78800 | 47.5 |
| 8 | 3719.23500 | 0.18580 | | |
| 9 | 15.76250 | 0.93890 | 1.94595 | 18.0 |
| 10 | 241.02260 | Variable | | |
| 11(Diaphragm) | ∞ | 0.62500 | | |
| 12* | 6.04420 | 2.42890 | 1.52996 | 55.8 |
| 13* | −12.20880 | 0.15000 | | |
| 14 | 5.00670 | 1.73130 | 1.69680 | 55.5 |
| 15 | −18.19830 | 0.01000 | 1.56732 | 42.8 |
| 16 | −18.19830 | 0.30000 | 1.90366 | 31.3 |
| 17 | 3.78650 | Variable | | |
| 18* | 8.98600 | 1.65400 | 1.51845 | 70.0 |
| 19* | 37.48960 | Variable | | |
| 20 | ∞ | 0.78000 | 1.51680 | 64.2 |
| 21 | ∞ | (BF) | | |
| Image surface | ∞ | | | |

TABLE 14

(Aspherical data)

Surface No. 5

K = 0.00000E+00, A4 = 1.70780E−04, A6 = −1.75666E−06,
A8 = −3.38736E−09 A10 = 0.00000E+00, A12 = 0.00000E+00

Surface No. 6

K = 0.00000E+00, A4 = 1.17656E−04, A6 = −6.52089E−06,
A8 = 2.48150E−06 A10 = −1.34835E−07, A12 = 3.01206E−09

Surface No. 12

K = 0.00000E+00, A4 = −3.16945E−04, A6 = −7.49065E−06,
A8 = 4.47061E−06 A10 = −3.13132E−07, A12 = 0.00000E+00

Surface No. 13

K = 0.00000E+00, A4 = 5.47088E−04, A6 = 6.18643E−06,
A8 = 2.37386E−06 A10 = −9.42368E−08, A12 = 0.00000E+00

Surface No. 18

K = 0.00000E+00, A4 = −3.91662E−04, A6 = 2.92529E−05,
A8 = −1.76210E−06 A10 = 5.43748E−08, A12 = −1.45926E−09

Surface No. 19

K = 0.00000E+00, A4 = −2.94164E−04, A6 = 1.58489E−05,
A8 = −4.20391E−07 A10 = −2.06480E−08, A12 = 0.00000E+00

TABLE 15

(Various data)

Zooming ratio 7.53678

|  | Wide-angle limit | Middle position | Telephoto limit |
|---|---|---|---|
| Focal length | 5.1735 | 14.2140 | 38.9916 |
| F-number | 3.36744 | 4.49445 | 6.13224 |
| View angle | 39.6852 | 15.4779 | 5.6005 |
| Image height | 3.7000 | 3.9000 | 3.9000 |
| Overall length of lens system | 38.8615 | 41.8141 | 51.9178 |
| BF | 0.59451 | 0.57147 | 0.53621 |
| d4 | 0.3000 | 7.1102 | 14.5074 |
| d10 | 13.8831 | 4.5255 | 0.3909 |

TABLE 15-continued

(Various data)

| | | | |
|---|---|---|---|
| d17 | 5.5291 | 8.0870 | 16.8559 |
| d19 | 2.5988 | 5.5639 | 3.6714 |
| Entrance pupil position | 10.0502 | 22.6053 | 49.1082 |
| Exit pupil position | −15.7751 | −25.7248 | −124.3886 |
| Front principal points position | 13.5886 | 29.1361 | 75.9298 |
| Back principal points position | 33.6880 | 27.6001 | 12.9262 |

Single lens data

| Lens element | Initial surface number | Focal length |
|---|---|---|
| 1 | 1 | −38.0378 |
| 2 | 3 | 17.3378 |
| 3 | 5 | −7.1119 |
| 4 | 7 | −16.6952 |
| 5 | 9 | 17.7932 |
| 6 | 12 | 7.9970 |
| 7 | 14 | 5.8131 |
| 8 | 16 | −3.4462 |
| 9 | 18 | 22.3537 |

Zoom lens unit data

| Lens unit | Initial surface No. | Focal length | Overall length of lens unit | Front principal points position | Back principal points position |
|---|---|---|---|---|---|
| 1 | 1 | 32.96383 | 3.65200 | −0.50334 | 1.09776 |
| 2 | 5 | −7.09043 | 4.62480 | 0.07085 | 0.72709 |
| 3 | 11 | 9.73079 | 5.24520 | −2.55567 | 0.92664 |
| 4 | 18 | 22.35374 | 1.65400 | −0.33673 | 0.24916 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.30897 | −0.43936 | −0.81118 |
| 3 | 11 | −0.65857 | −1.53424 | −2.00876 |
| 4 | 18 | 0.77130 | 0.63968 | 0.72592 |

NUMERICAL EXAMPLE 6

Figure 16:
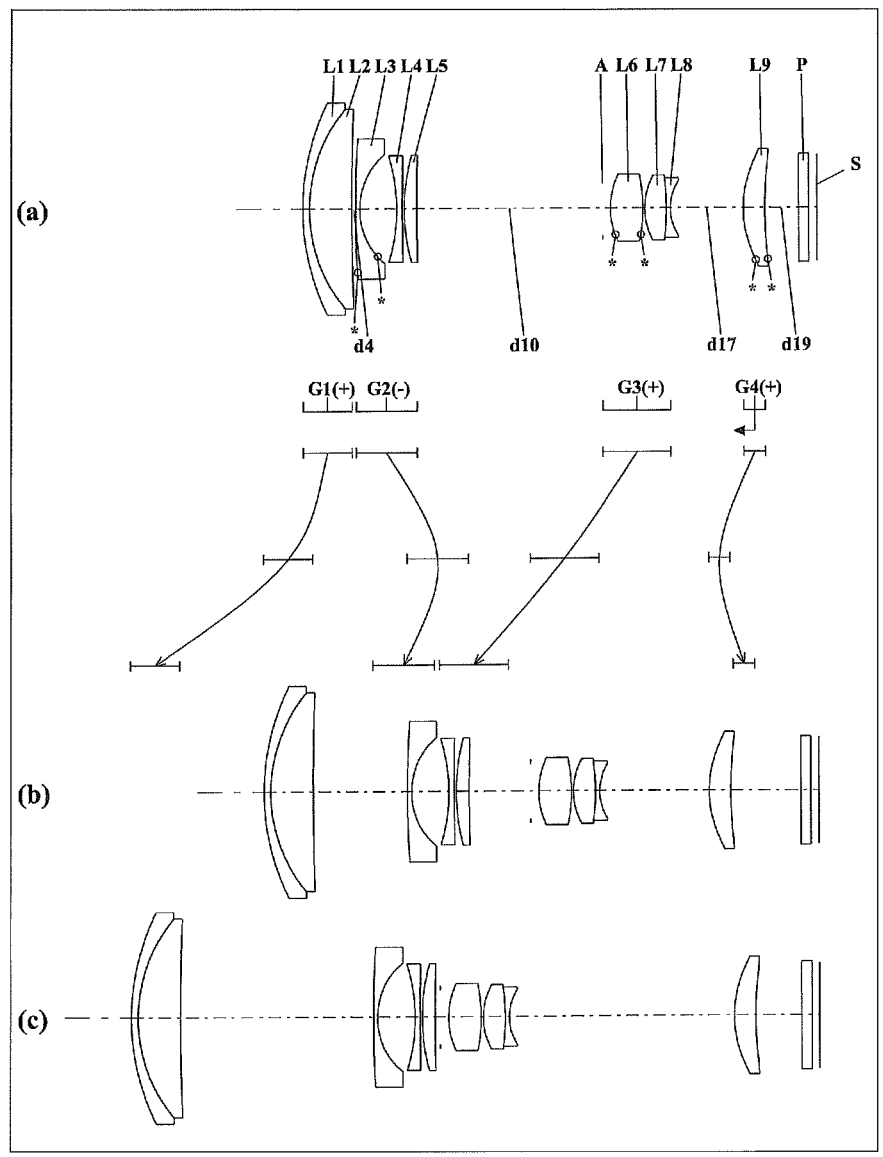
FIG. 16 is a lens arrangement diagram showing an infinity in-focus condition of a zoom lens system according to Embodiment 6 (Example 6).
Figure 17:
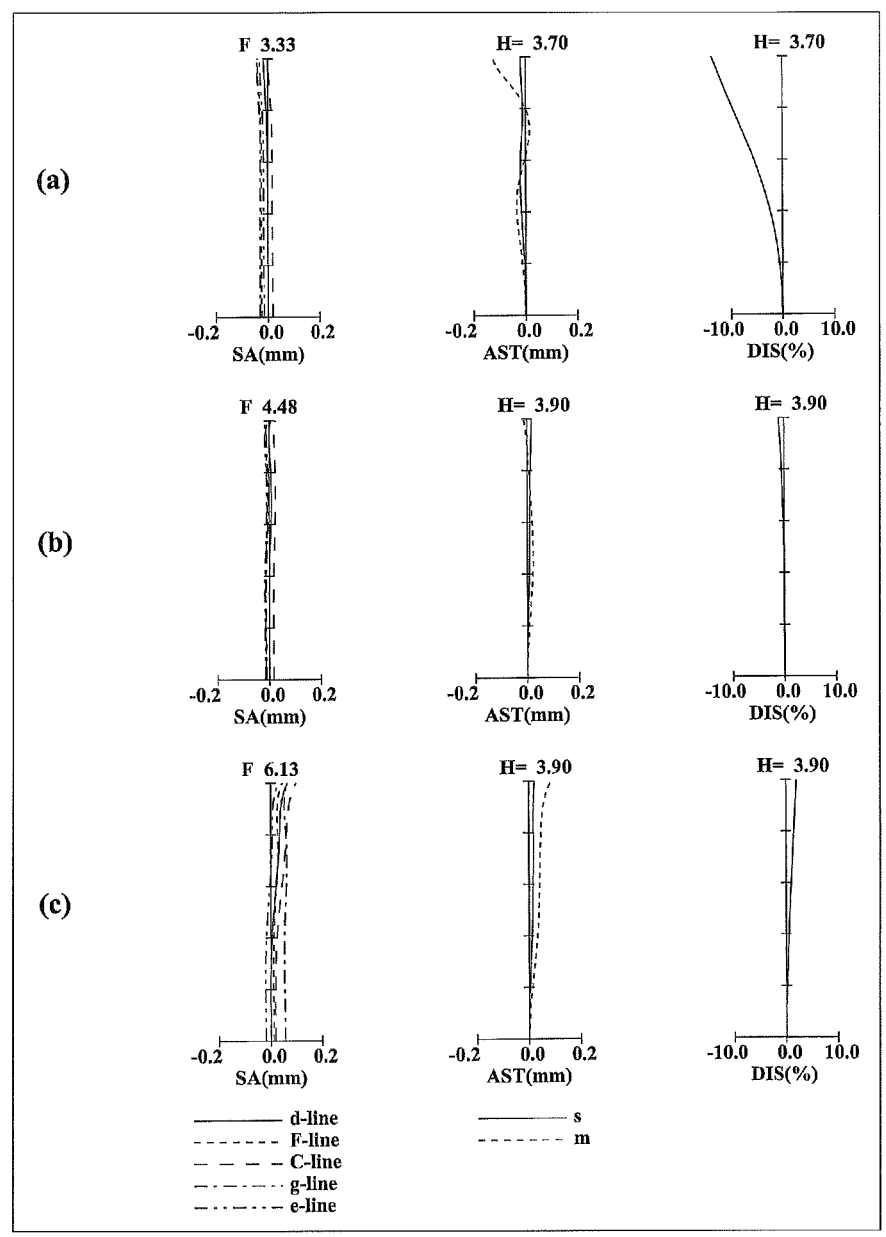
FIG. 17 is a longitudinal aberration diagram of an infinity in-focus condition of a zoom lens system according to Example 6.
Figure 18:
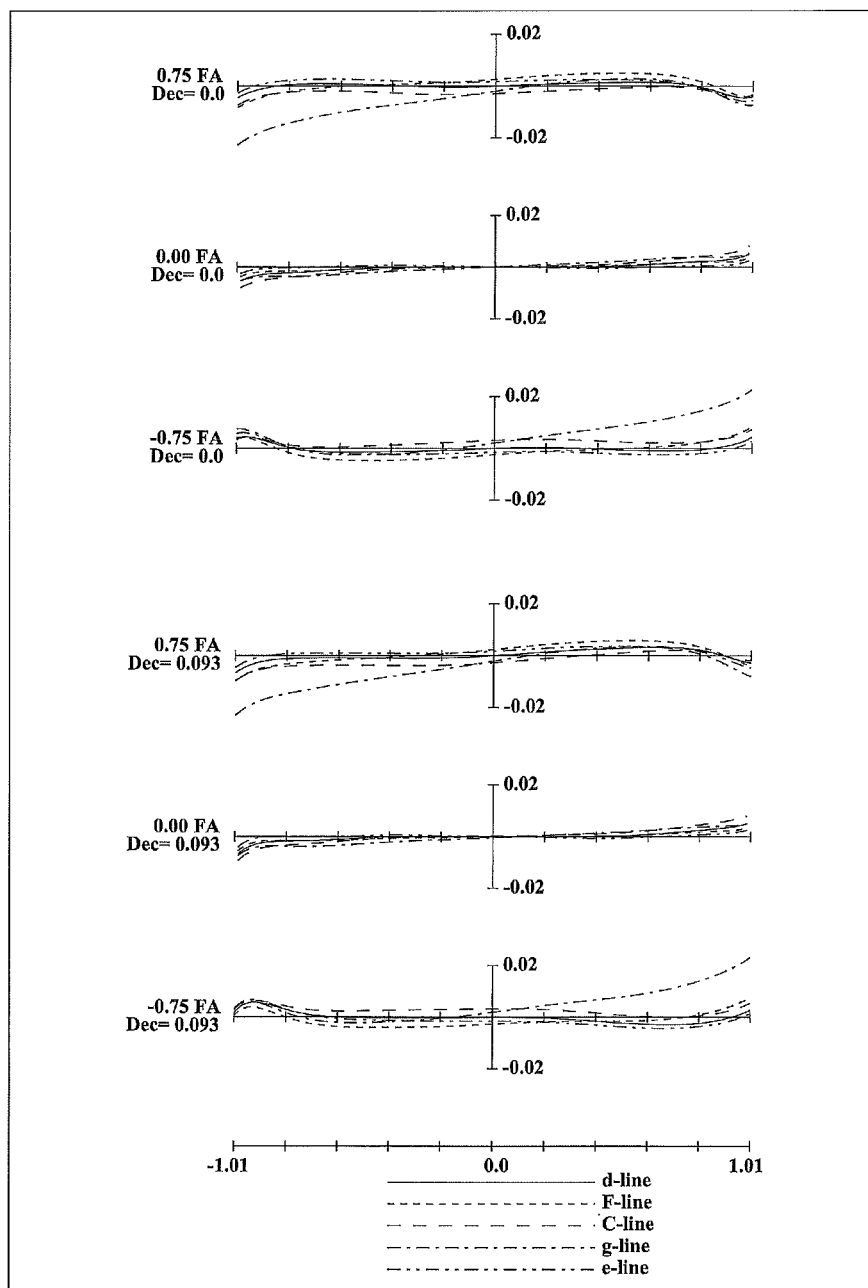
FIG. 18 is a lateral aberration diagram of a zoom lens system according to Example 6 at a telephoto limit in a basic state where image blur compensation is not performed and in a blur compensation state.

The zoom lens system of Numerical Example 6 corresponds to Embodiment 6 shown in FIG. 16. Table 16 shows the surface data of the zoom lens system of Numerical Example 6. Table 17 shows the aspherical data. Table 18 shows various data.

TABLE 16

(Surface data)

| Surface number | r | d | nd | vd |
|---|---|---|---|---|
| Object surface | ∞ | | | |
| 1 | 17.83520 | 0.50000 | 1.92286 | 20.9 |
| 2 | 11.77160 | 0.01000 | 1.56732 | 42.8 |
| 3 | 11.77160 | 3.21320 | 1.70154 | 41.1 |
| 4 | 199.69830 | Variable | | |
| 5* | 199.42250 | 0.30000 | 1.80470 | 41.0 |
| 6* | 5.56610 | 2.81280 | | |
| 7 | −13.71530 | 0.40000 | 1.77250 | 49.6 |
| 8 | 316.88190 | 0.15000 | | |
| 9 | 15.13610 | 0.95450 | 1.94595 | 18.0 |
| 10 | 157.52110 | Variable | | |
| 11(Diaphragm) | ∞ | 0.62500 | | |
| 12* | 5.89790 | 2.43820 | 1.54410 | 56.1 |
| 13* | −12.10470 | 0.15000 | | |
| 14 | 5.14340 | 1.65300 | 1.69680 | 55.5 |
| 15 | −16.97170 | 0.01000 | 1.56732 | 42.8 |
| 16 | −16.97170 | 0.30000 | 1.90366 | 31.3 |
| 17 | 3.77790 | Variable | | |
| 18* | 8.45240 | 1.61880 | 1.51443 | 63.3 |
| 19* | 27.61500 | Variable | | |
| 20 | ∞ | 0.78000 | 1.51680 | 64.2 |
| 21 | ∞ | (BF) | | |
| Image surface | ∞ | | | |

TABLE 17

(Aspherical data)

Surface No. 5

K = 0.00000E+00, A4 = 1.77604E−04, A6 = −2.20211E−06, A8 = 3.36483E−09 A10 = 0.00000E+00, A12 = 0.00000E+00

Surface No. 6

K = 0.00000E+00, A4 = 1.31794E−04, A6 = −6.16913E−06, A8 = 2.36041E−06 A10 = −1.29947E−07, A12 = 2.81369E−09

Surface No. 12

K = 0.00000E+00, A4 = −4.54176E−04, A6 = −1.76469E−05, A8 = 4.29393E−06 A10 = −3.41897E−07, A12 = 0.00000E+00

Surface No. 13

K = 0.00000E+00, A4 = 4.45972E−04, A6 = −3.07567E−06, A8 = 1.99978E−06 A10 = −1.30307E−07, A12 = 0.00000E+00

Surface No. 18

K = 0.00000E+00, A4 = −2.37774E−04, A6 = 1.14625E−05, A8 = −6.99293E−07 A10 = 2.36503E−08, A12 = −1.02186E−09

Surface No. 19

K = 0.00000E+00, A4 = −1.20609E−04, A6 = −1.09827E−06, A8 = 3.03996E−07 A10 = −3.01827E−08, A12 = 0.00000E+00

TABLE 18

(Various data)

Zooming ratio 7.53492

| | Wide-angle limit | Middle position | Telephoto limit |
|---|---|---|---|
| Focal length | 5.1741 | 14.2159 | 38.9864 |
| F-number | 3.33258 | 4.48231 | 6.12929 |
| View angle | 39.6961 | 15.5061 | 5.6014 |
| Image height | 3.7000 | 3.9000 | 3.9000 |
| Overall length of lens system | 38.8846 | 41.9146 | 51.9540 |
| BF | 0.59064 | 0.57242 | 0.54360 |
| d4 | 0.3000 | 7.1473 | 14.5962 |
| d10 | 13.9810 | 4.6401 | 0.4013 |
| d17 | 5.5392 | 8.3586 | 17.0324 |
| d19 | 2.5583 | 5.2807 | 3.4650 |
| Entrance pupil position | 10.1565 | 22.6838 | 48.7746 |
| Exit pupil position | −15.3659 | −25.5078 | −109.3507 |
| Front principal points position | 13.6529 | 29.1508 | 73.9301 |
| Back principal points position | 33.7106 | 27.6987 | 12.9676 |

TABLE 18-continued (Various data)

Single lens data

| Lens element | Initial surface number | Focal length |
|---|---|---|
| 1 | 1 | −39.0646 |
| 2 | 3 | 17.7058 |
| 3 | 5 | −7.1205 |
| 4 | 7 | −17.0089 |
| 5 | 9 | 17.6445 |
| 6 | 12 | 7.6538 |
| 7 | 14 | 5.8441 |
| 8 | 16 | −3.3962 |
| 9 | 18 | 23.0175 |

Zoom lens unit data

| Lens unit | Initial surface No. | Focal length | Overall length of lens unit | Front principal points position | Back principal points position |
|---|---|---|---|---|---|
| 1 | 1 | 33.38997 | 3.72320 | −0.41462 | 1.17625 |
| 2 | 5 | −7.17190 | 4.61730 | 0.06504 | 0.73729 |
| 3 | 11 | 9.71652 | 5.17620 | −2.55396 | 0.88567 |
| 4 | 18 | 23.01746 | 1.61880 | −0.45833 | 0.12137 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.30773 | −0.43575 | −0.79600 |
| 3 | 11 | −0.64909 | −1.48419 | −1.98638 |
| 4 | 18 | 0.77580 | 0.65831 | 0.73845 |

NUMERICAL EXAMPLE 7

Figure 19:
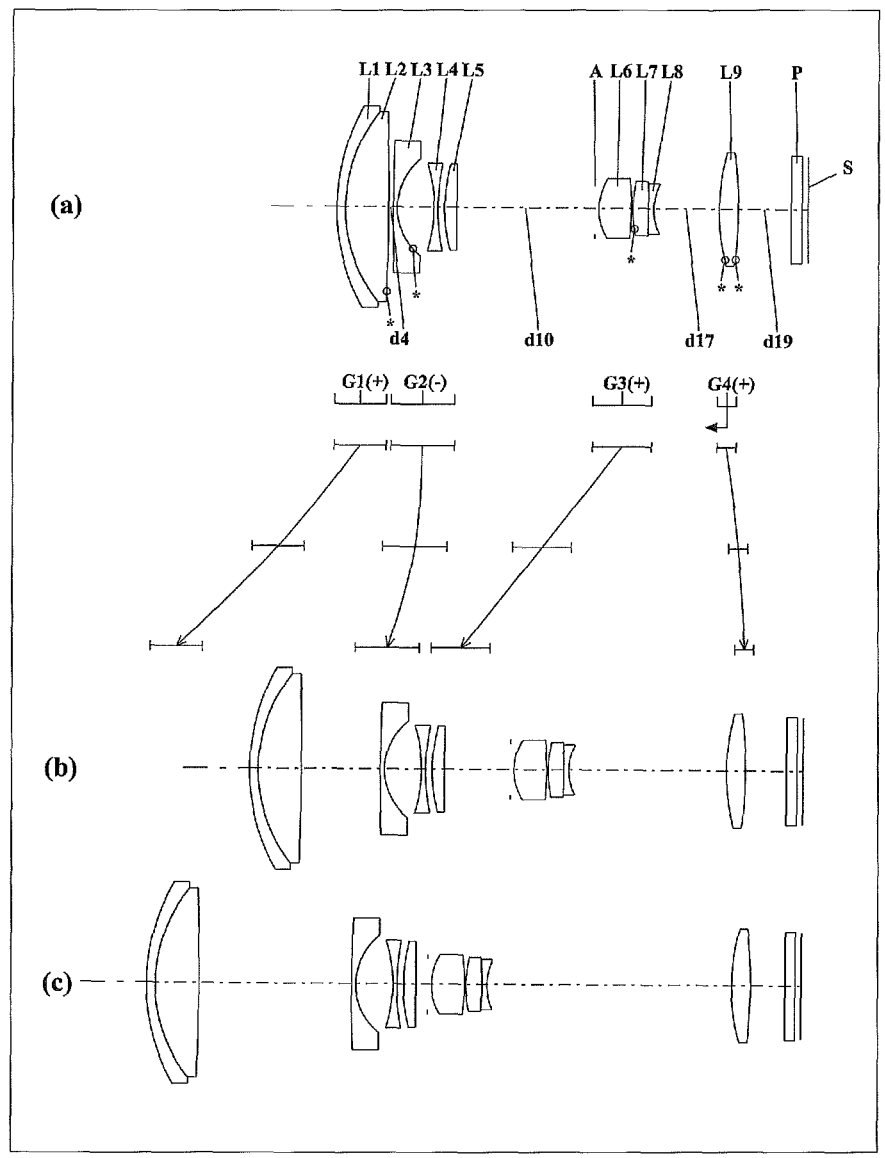
FIG. 19 is a lens arrangement diagram showing an infinity in-focus condition of a zoom lens system according to Embodiment 7 (Example 7).
Figure 20:
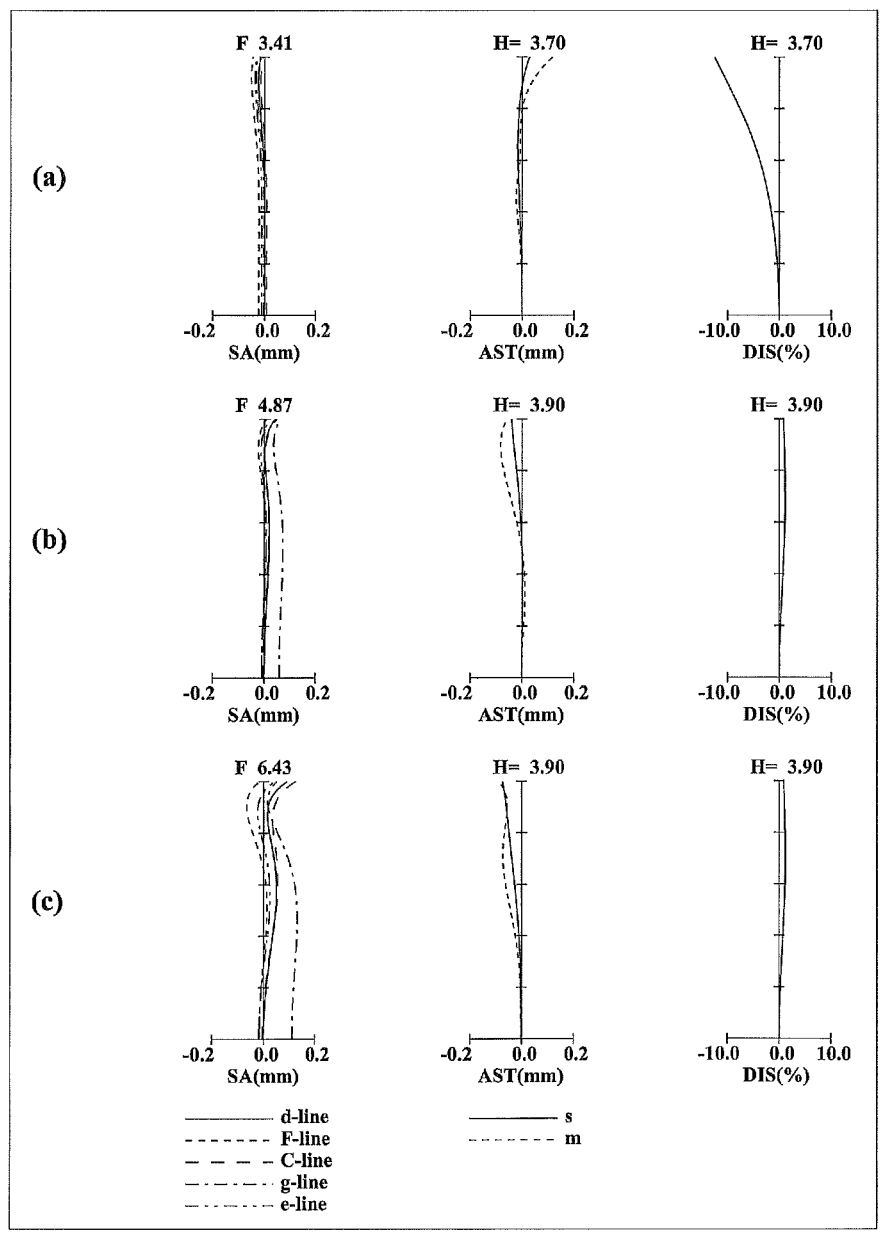
FIG. 20 is a longitudinal aberration diagram of an infinity in-focus condition of a zoom lens system according to Example 7.
Figure 21:
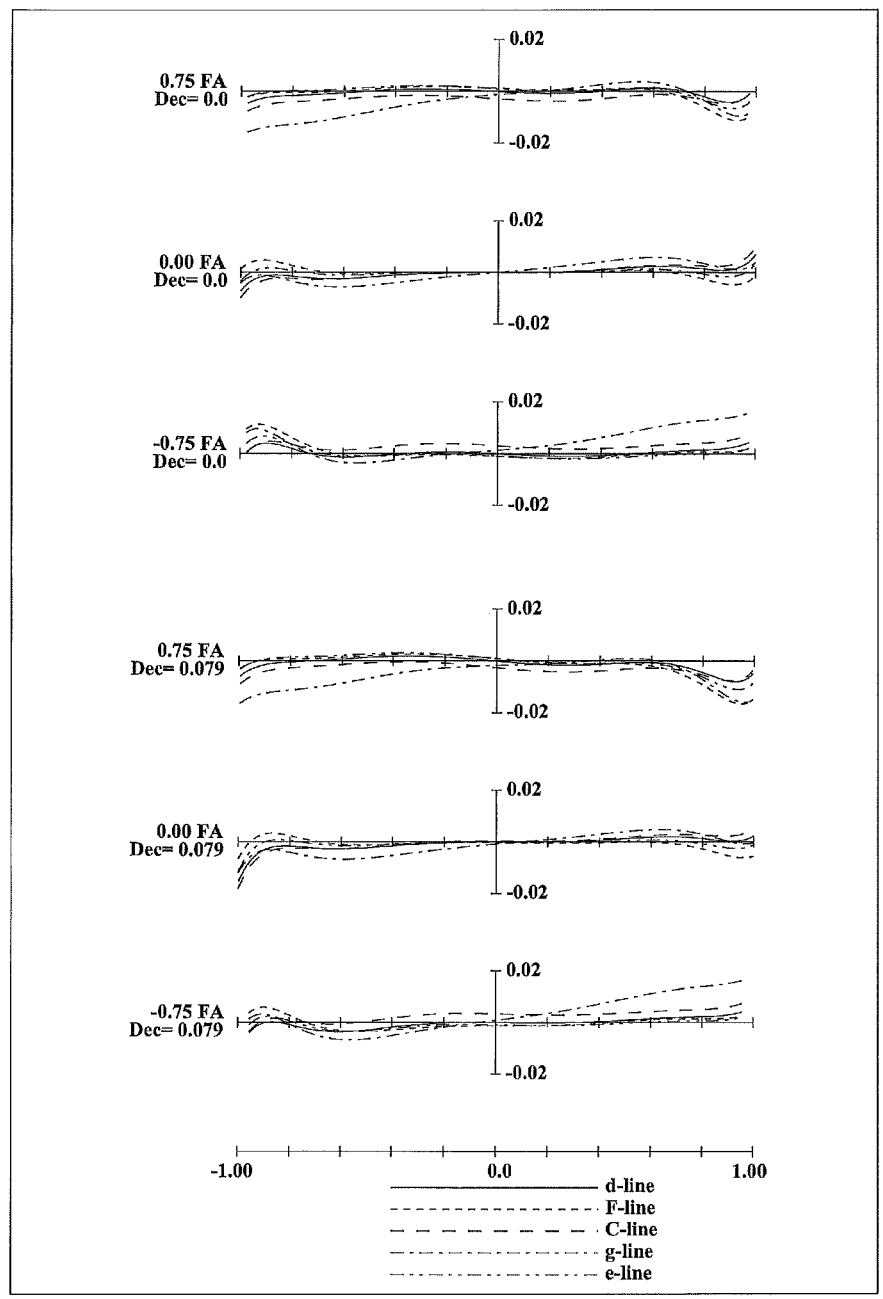
FIG. 21 is a lateral aberration diagram of a zoom lens system according to Example 7 at a telephoto limit in a basic state where image blur compensation is not performed and in a blur compensation state.

The zoom lens system of Numerical Example 7 corresponds to Embodiment 7 shown in FIG. 19. Table 19 shows the surface data of the zoom lens system of Numerical Example 7. Table 20 shows the aspherical data. Table 21 shows various data.

TABLE 19

(Surface data)

| Surface number | r | d | nd | vd |
|---|---|---|---|---|
| Object surface | ∞ | | | |
| 1 | 15.46060 | 0.65000 | 1.84666 | 23.8 |
| 2 | 11.39100 | 0.01000 | 1.56732 | 42.8 |
| 3 | 11.39100 | 3.27410 | 1.58332 | 59.1 |
| 4* | −184.16440 | Variable | | |
| 5 | 140.14150 | 0.30000 | 1.52996 | 55.8 |
| 6* | 4.67800 | 2.78410 | | |
| 7 | −11.15550 | 0.30000 | 1.81600 | 46.6 |
| 8 | 16.49970 | 0.50740 | | |
| 9 | 12.74390 | 0.91570 | 1.92286 | 20.9 |
| 10 | ∞ | Variable | | |
| 11(Diaphragm) | ∞ | 0.30000 | | |
| 12 | 4.29620 | 2.48030 | 1.49700 | 81.6 |
| 13 | −19.07390 | 0.10000 | | |
| 14* | 7.57030 | 1.18220 | 1.52996 | 55.8 |
| 15 | −46.65440 | 0.01000 | 1.56732 | 42.8 |
| 16 | −46.65440 | 0.40000 | 1.58387 | 30.9 |
| 17 | 4.23240 | Variable | | |
| 18* | 18.72490 | 1.41970 | 1.52996 | 55.8 |
| 19* | −29.55700 | Variable | | |
| 20 | ∞ | 0.78000 | 1.51680 | 64.2 |
| 21 | ∞ | (BF) | | |
| Image surface | ∞ | | | |

TABLE 20

(Aspherical data)

Surface No. 4

K = 0.00000E+00, A4 = 1.31901E−05, A6 = 3.03104E−08,
A8 = 2.39305E−09 A10 = −1.65140E−10, A12 = 3.00698E−12,
A14 = −1.79574E−14

Surface No. 6

K = 0.00000E+00, A4 = −1.18465E−04, A6 = 2.04281E−06,
A8 = −4.24046E−06 A10 = 1.04803E−06, A12 = −8.75870E−08,
A14 = 2.75614E−09

Surface No. 14

K = 0.00000E+00, A4 = −2.81173E−03, A6 = −1.57291E−04,
A8 = 4.03746E−06 A10 = −2.73995E−06, A12 = 0.00000E+00,
A14 = 0.00000E+00

Surface No. 18

K = 0.00000E+00, A4 = 3.72212E−04, A6 = 1.77316E−06,
A8 = −1.07881E−06 A10 = 3.05834E−08, A12 = 0.00000E+00,
A14 = 0.00000E+00

Surface No. 19

K = 0.00000E+00, A4 = 7.11115E−04, A6 = −3.57053E−05,
A8 = 5.92606E−08 A10 = 1.72177E−08, A12 = 0.00000E+00,
A14 = 0.00000E+00

TABLE 21

(Various data)

Zooming ratio 6.67767

| | Wide-angle limit | Middle position | Telephoto limit |
|---|---|---|---|
| Focal length | 5.5506 | 14.3299 | 37.0650 |
| F-number | 3.40654 | 4.86979 | 6.43021 |
| View angle | 37.3049 | 15.1093 | 5.9559 |
| Image height | 3.7000 | 3.9000 | 3.9000 |
| Overall length of lens system | 35.6919 | 41.8395 | 49.4547 |
| BF | 0.49543 | 0.46289 | 0.45682 |
| d4 | 0.3300 | 5.9780 | 11.6037 |
| d10 | 10.4477 | 4.9511 | 0.8900 |
| d17 | 4.9562 | 11.9061 | 18.5023 |
| d19 | 4.0491 | 3.1279 | 2.5884 |
| Entrance pupil position | 10.5916 | 22.7498 | 43.7283 |
| Exit pupil position | −17.0686 | −48.8263 | −793.0001 |
| Front principal points position | 14.3881 | 32.9136 | 79.0618 |
| Back principal points position | 30.1413 | 27.5096 | 12.3897 |

Single lens data

| Lens element | Initial surface number | Focal length |
|---|---|---|
| 1 | 1 | −55.1510 |
| 2 | 3 | 18.5045 |
| 3 | 5 | −9.1389 |
| 4 | 7 | −8.1168 |
| 5 | 9 | 13.8091 |
| 6 | 12 | 7.3129 |
| 7 | 14 | 12.3839 |
| 8 | 16 | −6.6268 |
| 9 | 18 | 21.8524 |

TABLE 21-continued (Various data)

Zoom lens unit data

| Lens unit | Initial surface No. | Focal length | Overall length of lens unit | Front principal points position | Back principal points position |
|---|---|---|---|---|---|
| 1 | 1 | 28.58370 | 3.93410 | −0.01115 | 1.48081 |
| 2 | 5 | −6.09278 | 4.80720 | 0.72216 | 1.43559 |
| 3 | 11 | 9.14446 | 4.47250 | −1.50594 | 0.78169 |
| 4 | 18 | 21.85237 | 1.41970 | 0.36358 | 0.84580 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.32092 | −0.45682 | −0.79006 |
| 3 | 11 | −0.81523 | −1.39645 | −2.02415 |
| 4 | 18 | 0.74224 | 0.78588 | 0.81085 |

NUMERICAL EXAMPLE 8

Figure 22:
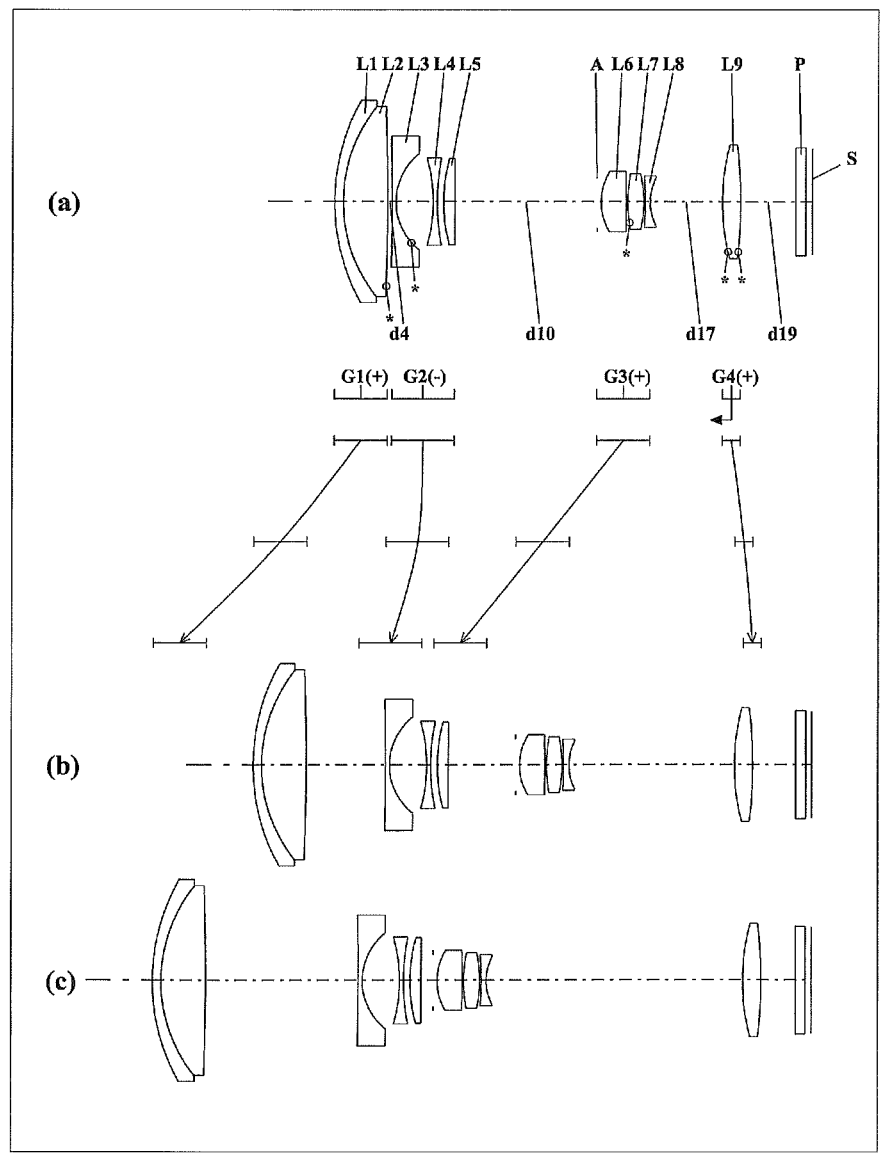
FIG. 22 is a lens arrangement diagram showing an infinity in-focus condition of a zoom lens system according to Embodiment 8 (Example 8).
Figure 23:
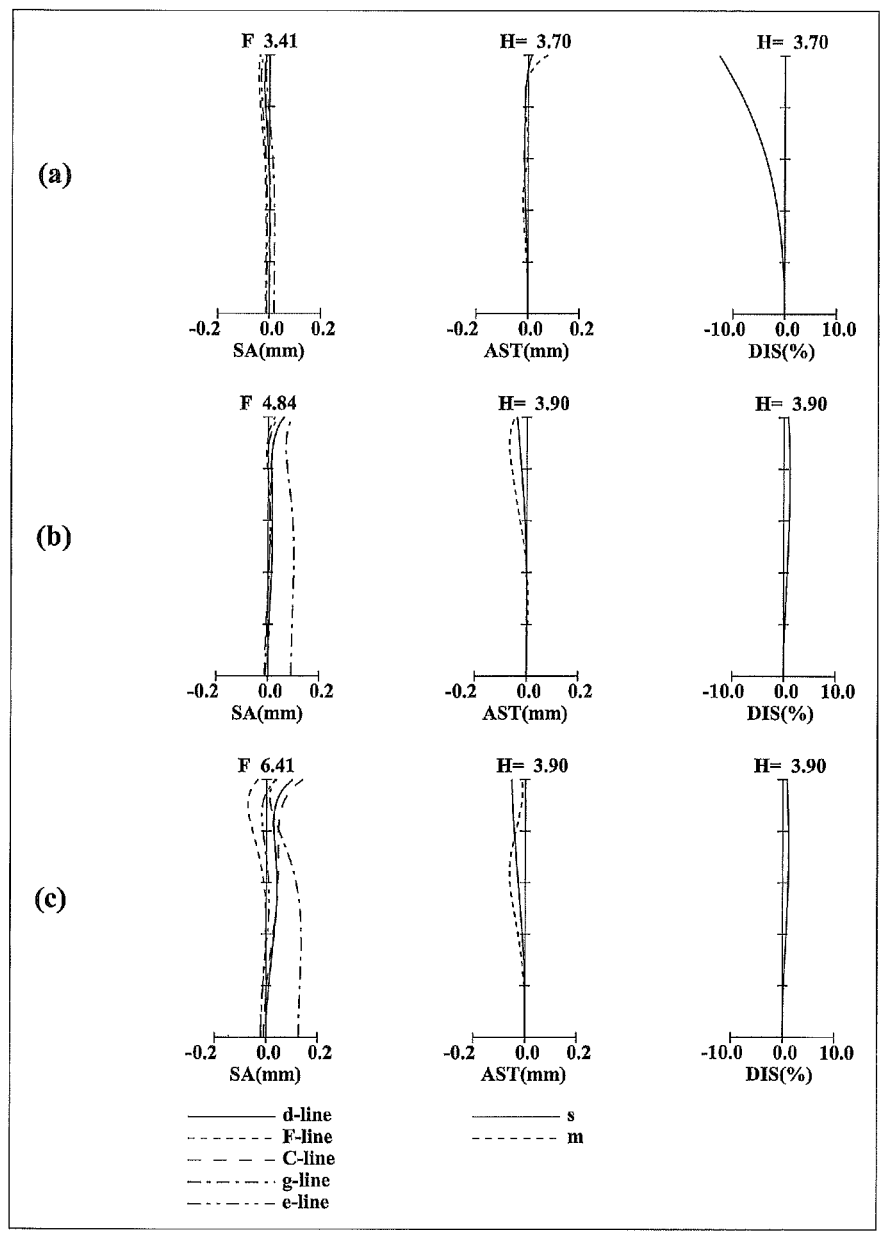
FIG. 23 is a longitudinal aberration diagram of an infinity in-focus condition of a zoom lens system according to Example 8.
Figure 24:
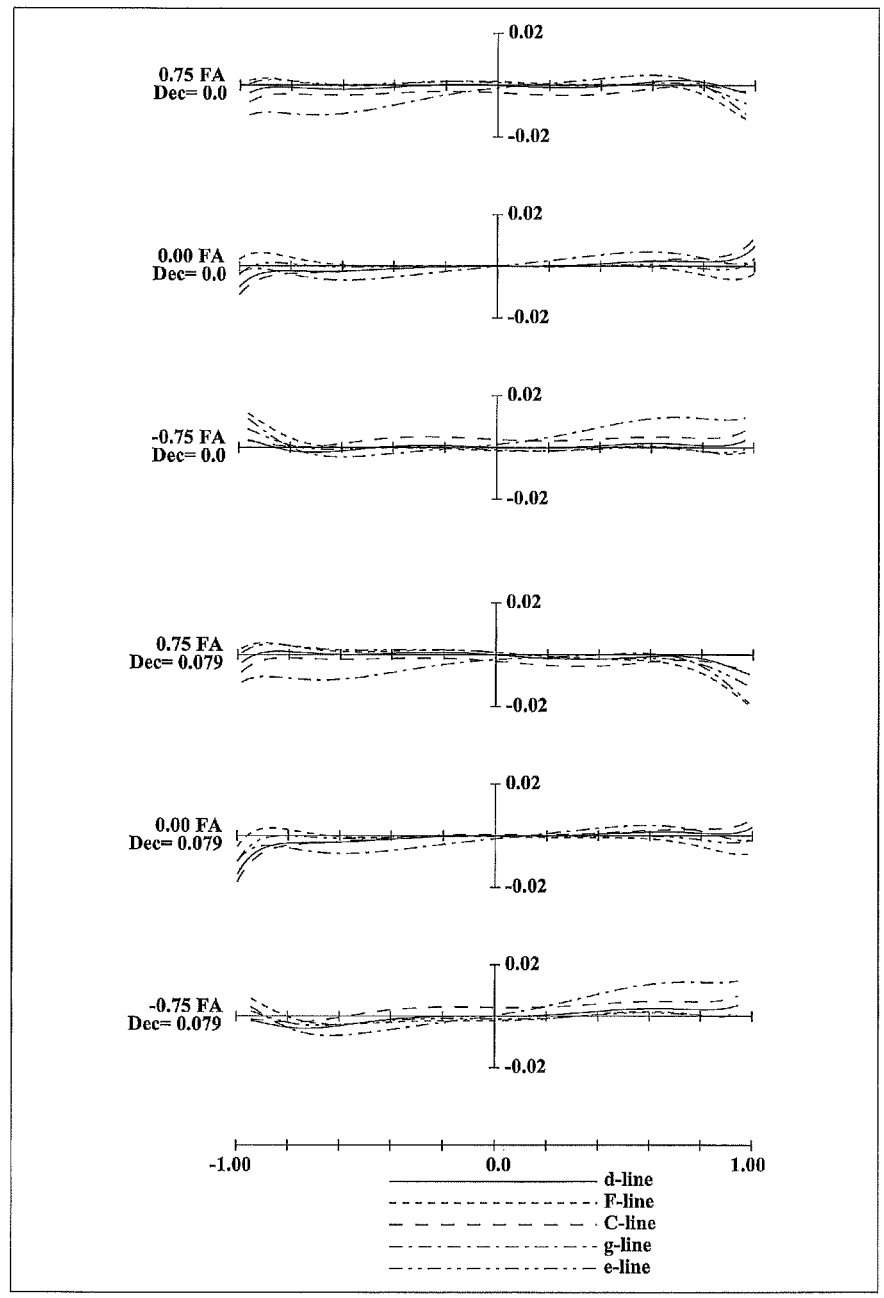
FIG. 24 is a lateral aberration diagram of a zoom lens system according to Example 8 at a telephoto limit in a basic state where image blur compensation is not performed and in a blur compensation state.

The zoom lens system of Numerical Example 8 corresponds to Embodiment 8 shown in FIG. 22. Table 22 shows the surface data of the zoom lens system of Numerical Example 8. Table 23 shows the aspherical data. Table 24 shows various data.

TABLE 22

(Surface data)

| Surface number | r | d | nd | vd |
|---|---|---|---|---|
| Object surface | ∞ | | | |
| 1 | 15.55420 | 0.65000 | 1.84666 | 23.8 |
| 2 | 11.46980 | 0.01000 | 1.56732 | 42.8 |
| 3 | 11.46980 | 3.35550 | 1.58332 | 59.1 |
| 4* | −163.32770 | Variable | | |
| 5 | −236.29390 | 0.30000 | 1.52996 | 55.8 |
| 6* | 4.57740 | 2.81170 | | |
| 7 | −12.22610 | 0.30000 | 1.81600 | 46.6 |
| 8 | 16.89160 | 0.49470 | | |
| 9 | 12.57070 | 0.84510 | 1.92286 | 20.9 |
| 10 | ∞ | Variable | | |
| 11(Diaphragm) | ∞ | 0.30000 | | |
| 12 | 4.36670 | 1.90240 | 1.49700 | 81.6 |
| 13 | −249.29220 | 0.10000 | | |
| 14* | 7.90730 | 1.21340 | 1.52996 | 55.8 |
| 15 | −9.44610 | 0.10000 | | |
| 16 | −32.42830 | 0.40000 | 1.58387 | 30.9 |
| 17 | 3.98840 | Variable | | |
| 18* | 19.91850 | 1.37760 | 1.52996 | 55.8 |
| 19* | −28.66460 | Variable | | |
| 20 | ∞ | 0.78000 | 1.51680 | 64.2 |
| 21 | ∞ | (BF) | | |
| Image surface | ∞ | | | |

TABLE 23

(Aspherical data)

Surface No. 4

K = 0.00000E+00, A4 = 1.45707E−05, A6 = −7.04140E−08,
A8 = 1.09527E−08 A10 = −4.93604E−10, A12 = 8.96549E−12,
A14 = −5.91168E−14

Surface No. 6

K = 0.00000E+00, A4 = −2.15651E−04, A6 = −2.09617E−05,
A8 = 2.17302E−06 A10 = 6.08565E−09, A12 = −1.54598E−08,
A14 = 7.00040E−10

TABLE 23-continued (Aspherical data)

Surface No. 14

K = 0.00000E+00, A4 = −3.13441E−03, A6 = −1.14529E−04,
A8 = −2.39648E−06 A10 = −2.49940E−07, A12 = 0.00000E+00,
A14 = 0.00000E+00

Surface No. 18

K = 0.00000E+00, A4 = 4.31871E−04, A6 = 1.23307E−05,
A8 = −2.36290E−06 A10 = 6.25471E−08, A12 = 0.00000E+00,
A14 = 0.00000E+00

Surface No. 19

K = 0.00000E+00, A4 = 7.27222E−04, A6 = −1.13146E−05,
A8 = −2.24735E−06 A10 = 7.23141E−08, A12 = 0.00000E+00,
A14 = 0.00000E+00

TABLE 24

(Various data)

Zooming ratio 6.68253

| | Wide-angle limit | Middle position | Telephoto limit |
|---|---|---|---|
| Focal length | 5.5488 | 14.3188 | 37.0800 |
| F-number | 3.40608 | 4.84130 | 6.41180 |
| View angle | 37.3716 | 15.1126 | 5.9575 |
| Image height | 3.7000 | 3.9000 | 3.9000 |
| Overall length of lens system | 36.1928 | 42.2307 | 49.7950 |
| BF | 0.49140 | 0.45460 | 0.46153 |
| d4 | 0.3300 | 5.9905 | 11.5402 |
| d10 | 10.7483 | 5.0680 | 0.8900 |
| d17 | 5.4943 | 12.5376 | 19.3851 |
| d19 | 4.1884 | 3.2396 | 2.5778 |
| Entrance pupil position | 10.5506 | 22.7495 | 43.3474 |
| Exit pupil position | −17.9591 | −51.1723 | −1259.5482 |
| Front principal points position | 14.4307 | 33.0970 | 79.3362 |
| Back principal points position | 30.6440 | 27.9120 | 12.7151 |

Single lens data

| Lens element | Initial surface number | Focal length |
|---|---|---|
| 1 | 1 | −55.6503 |
| 2 | 3 | 18.5036 |
| 3 | 5 | −8.4695 |
| 4 | 7 | −8.6518 |
| 5 | 9 | 13.6215 |
| 6 | 12 | 8.6565 |
| 7 | 14 | 8.3234 |
| 8 | 16 | −6.0583 |
| 9 | 18 | 22.3955 |

Zoom lens unit data

| Lens unit | Initial surface No. | Focal length | Overall length of lens unit | Front principal points position | Back principal points position |
|---|---|---|---|---|---|
| 1 | 1 | 28.43025 | 4.01550 | 0.02381 | 1.54243 |
| 2 | 5 | −6.14344 | 4.75150 | 0.58467 | 1.22996 |
| 3 | 11 | 9.40493 | 4.01580 | −1.34929 | 0.59057 |
| 4 | 18 | 22.39551 | 1.37760 | 0.37282 | 0.84107 |

TABLE 24-continued (Various data)

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 5 | −0.32507 | −0.46406 | −0.79900 |
| 3 | 11 | −0.80687 | −1.37707 | −1.99706 |
| 4 | 18 | 0.74412 | 0.78813 | 0.81737 |

The following Table 25 shows the corresponding values to the individual conditions in the zoom lens systems of the numerical examples.

TABLE 25

(Corresponding values to conditions)

| Condition | | Example | | | |
|---|---|---|---|---|---|
| | | 1 | 2 | 3 | 4 |
| (1) | $vd_{L12}$ | 37.99 | 41.15 | 37.99 | 41.15 |
| (a) | $f_T/f_W$ | 7.5 | 7.5 | 7.5 | 7.5 |
| (3) | $f_{G2}/t_{L21}$ | −23.5 | −23.7 | −24.2 | −23.8 |
| (4) | $L_T/f_T$ | 1.3 | 1.3 | 1.3 | 1.3 |
| (5) | $f_{G1}/|f_{G2}|$ | 4.7 | 4.4 | 4.6 | 4.6 |
| (6) | $f_T/f_{G1}$ | 1.2 | 1.2 | 1.2 | 1.2 |
| (7) | $\beta_{2T}/\beta_{2W}$ | 2.6 | 2.7 | 2.7 | 2.5 |

| Condition | | Example | | | |
|---|---|---|---|---|---|
| | | 5 | 6 | 7 | 8 |
| (2) when $vd_{L3n} \le 34$, $PgF_{L3n} + 0.0038 \times vd_{L3n} - 0.7250$ | | — | — | L8: 0.0434 | L8: 0.0434 |
| when $34 < vd_{L3n} < 59$, $PgF_{L3n} + 0.0020 \times vd_{L3n} - 0.6640$ | | L6: 0.0199 | L6: 0.0152 | L7: 0.0199 | L7: 0.0199 |
| (a) | $f_T/f_W$ | 7.5 | 7.5 | 6.7 | 6.7 |
| (3) | $f_{G2}/t_{L21}$ | −23.6 | −23.9 | −20.3 | −20.5 |
| (4) | $L_T/f_T$ | 1.3 | 1.3 | 1.3 | 1.3 |
| (5) | $f_{G1}/|f_{G2}|$ | 4.6 | 4.7 | 4.7 | 4.6 |
| (6) | $f_T/f_{G1}$ | 1.2 | 1.2 | 1.3 | 1.3 |
| (7) | $\beta_{2T}/\beta_{2W}$ | 2.6 | 2.6 | 2.5 | 2.5 |
| | $vd_{L3n}$ | L6: 55.8 | L6: 56.1 | L7: 55.8 L8: 30.9 | L7: 55.8 L8: 30.9 |
| | $PGF_{L3n}$ | L6: 0.5722 | L6: 0.5670 | L7: 0.5722 L8: 0.6508 | L7: 0.5722 L8: 0.6508 |

INDUSTRIAL APPLICABILITY

The zoom lens system according to the present invention is applicable to a digital input device such as a digital still camera, a digital video camera, a mobile telephone, a surveillance camera in a surveillance system, a Web camera or a vehicle-mounted camera. In particular, the zoom lens system according to the present invention is suitable for a photographing optical system where high image quality is required like in a digital still camera or a digital video camera.

| REFERENCE SIGNS LIST | |
|---|---|
| G1 | first lens unit |
| G2 | second lens unit |
| G3 | third lens unit |
| G4 | fourth lens unit |
| L1 | first lens element |
| L2 | second lens element |
| L3 | third lens element |
| L4 | fourth lens element |
| L5 | fifth lens element |
| L6 | sixth lens element |
| L7 | seventh lens element |
| L8 | eighth lens element |
| L9 | ninth lens element |
| A | aperture diaphragm |
| P | plane parallel plate |
| S | image surface |
| 1 | zoom lens system |
| 2 | image sensor |
| 3 | liquid crystal display monitor |
| 4 | body |
| 5 | main barrel |
| 6 | moving barrel |
| 7 | cylindrical cam |

The invention claimed is:

1. A zoom lens system, in order from an object side to an image side, comprising a first lens unit having positive optical power, a second lens unit having negative optical power, a third lens unit having positive optical power, and a fourth lens unit having positive optical power, wherein
the first lens unit is composed of a cemented lens element obtained by cementing one object side negative lens element and one image side positive lens element, wherein
the fourth lens unit is composed of one lens element, wherein
in zooming from a wide-angle limit to a telephoto limit at the time of image taking, the first lens unit, the second lens unit, the third lens unit, and the fourth lens unit are individually moved along an optical axis so that air spaces between the respective lens units vary, thereby performing magnification change, and wherein
the following conditions (1) and (a) are satisfied:

$$vd_{L12} < 43.50 \tag{1}$$

$$f_T/f_W \ge 6.0 \tag{a}$$

where, $vd_{L12}$ is an Abbe number to the d-line of the positive lens element in the first lens unit, $f_T$ is a focal length of the entire system at a telephoto limit, and $f_W$ is a focal length of the entire system at a wide-angle limit.

2. The zoom lens system as claimed in claim 1, wherein the following condition (3) is satisfied:

$$-30.0 < f_{G2}/t_{L21} < -5.0 \tag{3}$$

where, $f_{G2}$ is a composite focal length of the second lens unit, and $t_{L21}$ is an axial thickness of a most object side lens element in the second lens unit.

3. The zoom lens system as claimed in claim 1, wherein the following condition (4) is satisfied:

$$0.5 < L_T/f_T < 2.5 \quad (4)$$

where,
$L_T$ is an overall length of lens system at a telephoto limit (a distance from a most object side surface of the first lens unit to an image surface), and
$f_T$ is a focal length of the entire system at a telephoto limit.

4. The zoom lens system as claimed in claim 1, wherein the following condition (5) is satisfied:

$$3.5 < f_{G1}/|f_{G2}| < 6.0 \quad (5)$$

where,
$f_{G1}$ is a composite focal length of the first lens unit, and
$f_{G2}$ is a composite focal length of the second lens unit.

5. The zoom lens system as claimed in claim 1, wherein the following condition (6) is satisfied:

$$0.5 < f_T/f_{G1} < 3.0 \quad (6)$$

where,
$f_{G1}$ is a composite focal length of the first lens unit, and
$f_T$ is a focal length of the entire system at a telephoto limit.

6. The zoom lens system as claimed in claim 1, wherein the following condition (7) is satisfied:

$$2.0 < \beta_{2T}/\beta_{2W} < 6.5 \quad (7)$$

where,
$\beta_{2T}$ is a lateral magnification of the second lens unit at a telephoto limit and in an infinity in-focus condition, and
$\beta_{2W}$ is a lateral magnification of the second lens unit at a wide-angle limit and in an infinity in-focus condition.

7. An imaging device capable of outputting an optical image of an object as an electric image signal, comprising:
a zoom lens system that forms the optical image of the object; and
an image sensor that converts the optical image formed by the zoom lens system into the electric image signal, wherein
the zoom lens system is a zoom lens system as claimed in claim 1.

8. A camera for converting an optical image of an object into an electric image signal and then performing at least one of displaying and storing of the converted image signal, comprising:
an imaging device including a zoom lens system that forms the optical image of the object and an image sensor that converts the optical image formed by the zoom lens system into the electric image signal, wherein
the zoom lens system is a zoom lens system as claimed in claim 1.

9. A zoom lens system, in order from an object side to an image side, comprising a first lens unit having positive optical power, a second lens unit having negative optical power, a third lens unit having positive optical power, and a fourth lens unit having positive optical power, wherein
the first lens unit is composed of two lens elements, wherein
the fourth lens unit is composed of one lens element, wherein
in zooming from a wide-angle limit to a telephoto limit at the time of image taking, the first lens unit, the second lens unit, the third lens unit, and the fourth lens unit are individually moved along an optical axis so that air spaces between the respective lens units vary, thereby performing magnification change, wherein
the third lens unit is composed of three lens elements and at least one of the three lens elements satisfies the following condition (2), or at least two of lens elements constituting the third lens unit satisfy the following condition (2):

$$\begin{rcases} \text{when } vd_{L3n} \leq 34, \\ 0.0000 < PgF_{L3n} + 0.0038 \times vd_{L3n} - 0.7250 \\ \text{when } 34 < vd_{L3n} < 59, \\ 0.0000 < PgF_{L3n} + 0.0020 \times vd_{L3n} - 0.6640 \end{rcases} \quad (2)$$

where,
$vd_{L3n}$ is an Abbe number to the d-line of each lens element in the third lens unit,
$PgF_{L3n}$ is a partial dispersion ratio of each lens element in the third lens unit, which ratio is expressed by $$PgF_{L3n} = (ng - nF)/(nF - nC),$$

ng is a refractive index to the g-line,
nF is a refractive index to the F-line, and
nC is a refractive index to the C-line,
and wherein
the following condition (a) is satisfied:

$$f_T/f_W \geq 6.0 \quad (a)$$

where,
$f_T$ is a focal length of the entire system at a telephoto limit, and
$f_W$ is a focal length of the entire system at a wide-angle limit.

10. The zoom lens system as claimed in claim 9, wherein the following condition (3) is satisfied:

$$-30.0 < f_{G2}/t_{L21} < -5.0 \quad (3)$$

where,
$f_{G2}$ is a composite focal length of the second lens unit, and
$t_{L21}$ is an axial thickness of a most object side lens element in the second lens unit.

11. The zoom lens system as claimed in claim 9, wherein the following condition (4) is satisfied:

$$0.5 < L_T/f_T < 2.5 \quad (4)$$

where,
$L_T$ is an overall length of lens system at a telephoto limit (a distance from a most object side surface of the first lens unit to an image surface), and
$f_T$ is a focal length of the entire system at a telephoto limit.

12. The zoom lens system as claimed in claim 9, wherein the following condition (5) is satisfied:

$$3.5 < f_{G1}/|f_{G2}| < 6.0 \quad (5)$$

where,
$f_{G1}$ is a composite focal length of the first lens unit, and
$f_{G2}$ is a composite focal length of the second lens unit.

13. The zoom lens system as claimed in claim 9, wherein the following condition (6) is satisfied:

$$0.5 < f_T/f_{G1} < 3.0 \quad (6)$$

where,
$f_{G1}$ is a composite focal length of the first lens unit, and
$f_T$ is a focal length of the entire system at a telephoto limit.

14. The zoom lens system as claimed in claim 9, wherein the following condition (7) is satisfied:

$$2.0 < \beta_{2T}/\beta_{2W} < 6.5 \quad (7)$$

where, $\beta_{2T}$ is a lateral magnification of the second lens unit at a telephoto limit and in an infinity in-focus condition, and $\beta_{2W}$ is a lateral magnification of the second lens unit at a wide-angle limit and in an infinity in-focus condition.

15. An imaging device capable of outputting an optical image of an object as an electric image signal, comprising:

a zoom lens system that forms the optical image of the object; and an image sensor that converts the optical image formed by the zoom lens system into the electric image signal, wherein the zoom lens system is a zoom lens system as claimed in claim 9.

16. A camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system is a zoom lens system as claimed in claim 9.

\* \* \* \* \*